(12) United States Patent
Massey et al.

(10) Patent No.: US 9,659,496 B2
(45) Date of Patent: May 23, 2017

(54) PROXIMITY AWARENESS SYSTEM FOR MOTOR VEHICLES

(71) Applicant: Ridar Systems LLC, Palmer, MA (US)

(72) Inventors: Brent F. Massey, Palmer, MA (US); Greg L. Rouleau, Paragould, AR (US); Thaddeus Noll Selden, Sacramento, CA (US)

(73) Assignee: Ridar Systems LLC, Palmer, MA (US)

( * ) Notice: Subject to any disclaimer, the term of this patent is extended or adjusted under 35 U.S.C. 154(b) by 0 days.

(21) Appl. No.: 15/040,740

(22) Filed: Feb. 10, 2016

(65) Prior Publication Data

US 2016/0232790 A1    Aug. 11, 2016

Related U.S. Application Data

(60) Provisional application No. 62/114,236, filed on Feb. 10, 2015.

(51) Int. Cl.

| | | |
|---|---|---|
| *G01C 22/00* | (2006.01) | |
| *G08G 1/16* | (2006.01) | |
| *B60W 30/08* | (2012.01) | |
| *G08G 1/01* | (2006.01) | |
| *G08G 1/0967* | (2006.01) | |

(52) U.S. Cl.
CPC ............ *G08G 1/166* (2013.01); *B60W 30/08* (2013.01); *G08G 1/012* (2013.01); *G08G 1/0112* (2013.01); *G08G 1/0133* (2013.01); *G08G 1/0141* (2013.01); *G08G 1/096716* (2013.01); *G08G 1/096741* (2013.01); *G08G 1/096775* (2013.01); *G08G 1/164* (2013.01)

(58) Field of Classification Search
CPC ...... G08G 1/166; G08G 1/0112; B60W 30/08
See application file for complete search history.

(56) References Cited

U.S. PATENT DOCUMENTS

| | | | |
|---|---|---|---|
| 6,173,179 B1 | 1/2001 | Coutant | |
| 6,417,801 B1 | 7/2002 | van Diggelen | |
| 7,095,336 B2 | 8/2006 | Rodgers et al. | |
| 7,124,023 B2 | 10/2006 | Peeters | |
| 7,813,729 B2 | 10/2010 | Lee et al. | |
| 8,095,313 B1 * | 1/2012 | Blackburn | G08G 1/166 180/271 |
| 8,115,592 B2 | 2/2012 | Spence | |
| 8,125,348 B2 | 2/2012 | Cemper | |
| 8,321,092 B2 | 11/2012 | Browne et al. | |
| 8,436,746 B2 | 5/2013 | Cemper | |
| 8,525,695 B2 | 9/2013 | Cemper | |
| 8,576,067 B2 | 11/2013 | Malkin et al. | |
| 8,712,441 B2 | 4/2014 | Haney | |
| 8,818,721 B2 | 8/2014 | Hamilton et al. | |

(Continued)

OTHER PUBLICATIONS

Jahangiri, "UTC Project information," 2 pages, date unknown.
Jahangiri et al., "Developing and Evaluating a Smartphone Application Aimed at Reducing Crashes Involving Bicycles," 1 page, date unknown.

(Continued)

*Primary Examiner* — Adam Alharbi
(74) *Attorney, Agent, or Firm* — Sunstein Kann Murphy & Timbers LLP

(57) ABSTRACT

Various embodiments provide enhanced warnings of potential future adverse events (e.g., automobile crashes) by tracking the location and motion of multiple vehicles, and providing alerts or warnings to the drivers of such vehicles in the event that a risk of an adverse event is identified.

32 Claims, 17 Drawing Sheets

(56) References Cited

U.S. PATENT DOCUMENTS

| | | |
|---|---|---|
| 8,897,741 B2 | 11/2014 | Johnson |
| 9,000,903 B2 | 4/2015 | Bowers et al. |
| 9,129,519 B2 | 9/2015 | Aoude et al. |
| 9,132,773 B2 | 9/2015 | Washlow et al. |
| 9,134,721 B2 | 9/2015 | Koehrsen et al. |
| 2004/0230373 A1 | 11/2004 | Tzamaloukas |
| 2004/0254729 A1 | 12/2004 | Browne et al. |
| 2009/0009357 A1 | 1/2009 | Heen et al. |
| 2010/0188265 A1 | 7/2010 | Hill et al. |
| 2010/0279712 A1 | 11/2010 | Dicke et al. |
| 2013/0052614 A1* | 2/2013 | Mollicone ............ G09B 19/167 434/65 |
| 2013/0093895 A1 | 4/2013 | Palmer et al. |
| 2013/0127638 A1 | 5/2013 | Harrison |
| 2013/0147638 A1 | 6/2013 | Ricci |
| 2013/0238233 A1 | 9/2013 | Kim et al. |
| 2014/0032089 A1 | 1/2014 | Aoude et al. |

OTHER PUBLICATIONS

National Highway Traffic Safety Administration, Vehicle-to-Vehicle Communications: Readiness of V2V Technology for Application, 327 pages, Aug. 2014.

Virginia Polytechnic Institute and State University, "Connected Motorcycle Crash Warning, Interfaces," Connected Vehicle/Infrastructure—UTC, 2 pages, Oct. 14, 2015.

Connected Vehicle/Infrastructure University Transportation Center, "Developing and Evaluating a Smartphone Application Aimed at Reducing Crashes Involving Bicycles," TRB Research in Progress, 2 pages, Oct. 18, 2014.

International Searching Authority, Invitation to Pay Additional Fees—Application No. PCT/US16/17383, 2 pages, Apr. 13, 2016.

International Searching Authority, ISR and Written Opinion regarding International Application No. PCT/US16/17383, 16 pages, dated Jul. 5, 2016.

* cited by examiner

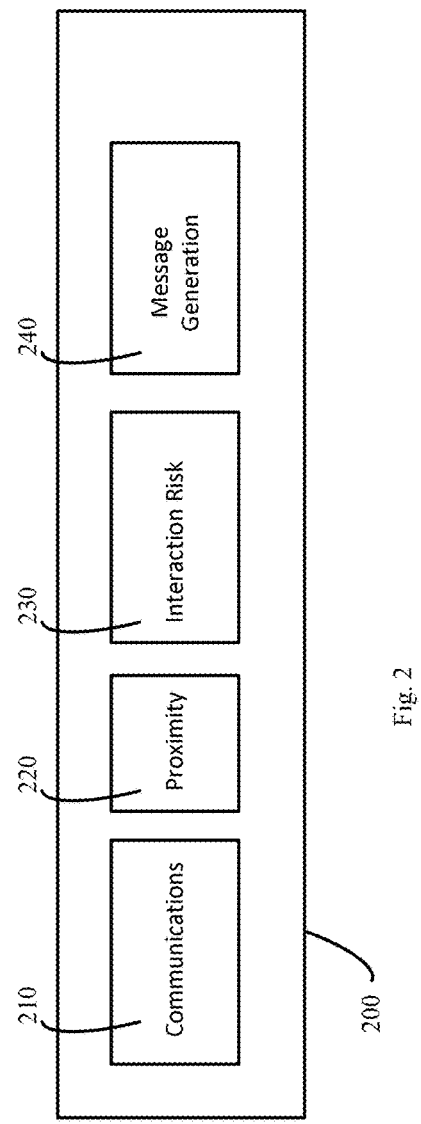

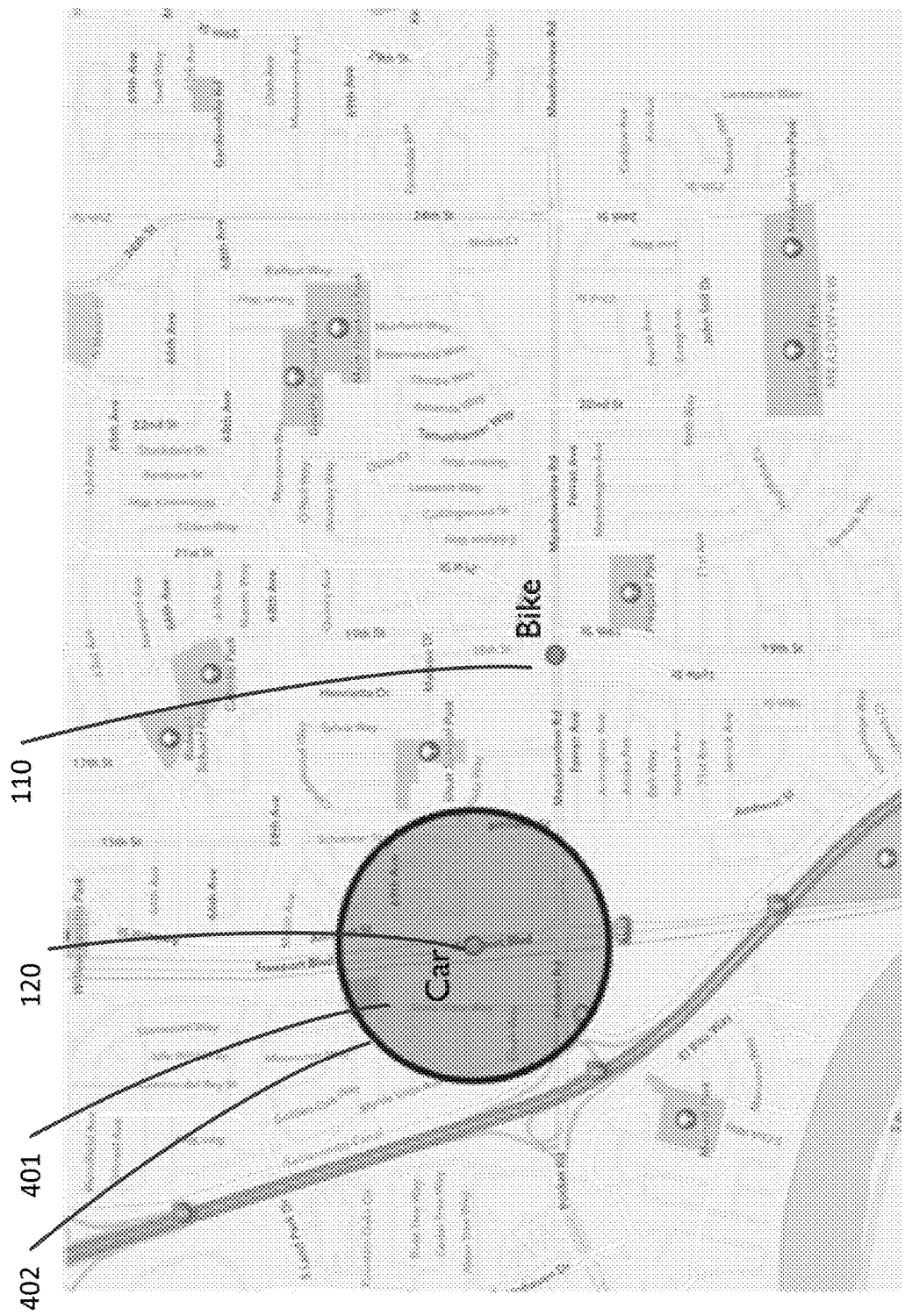

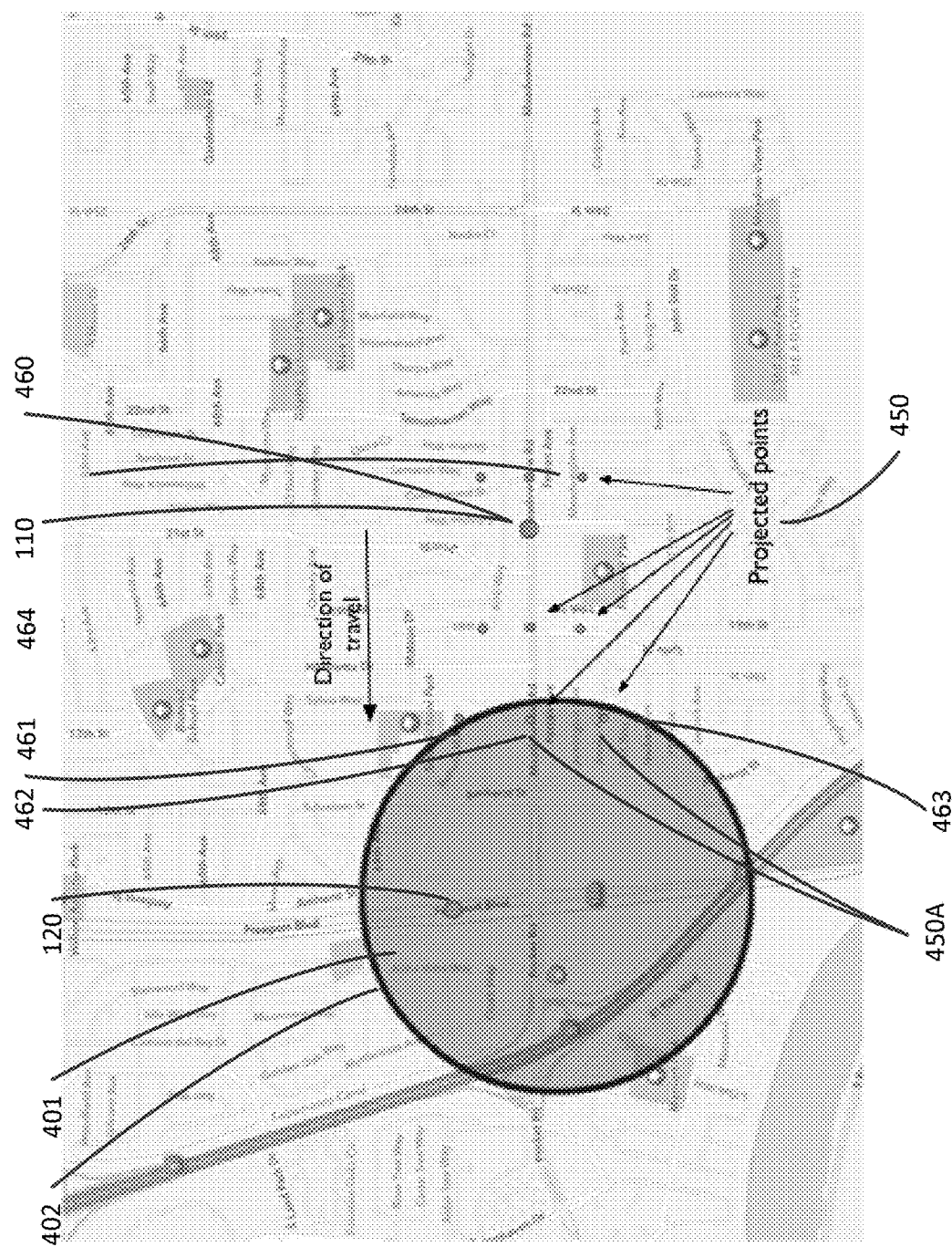

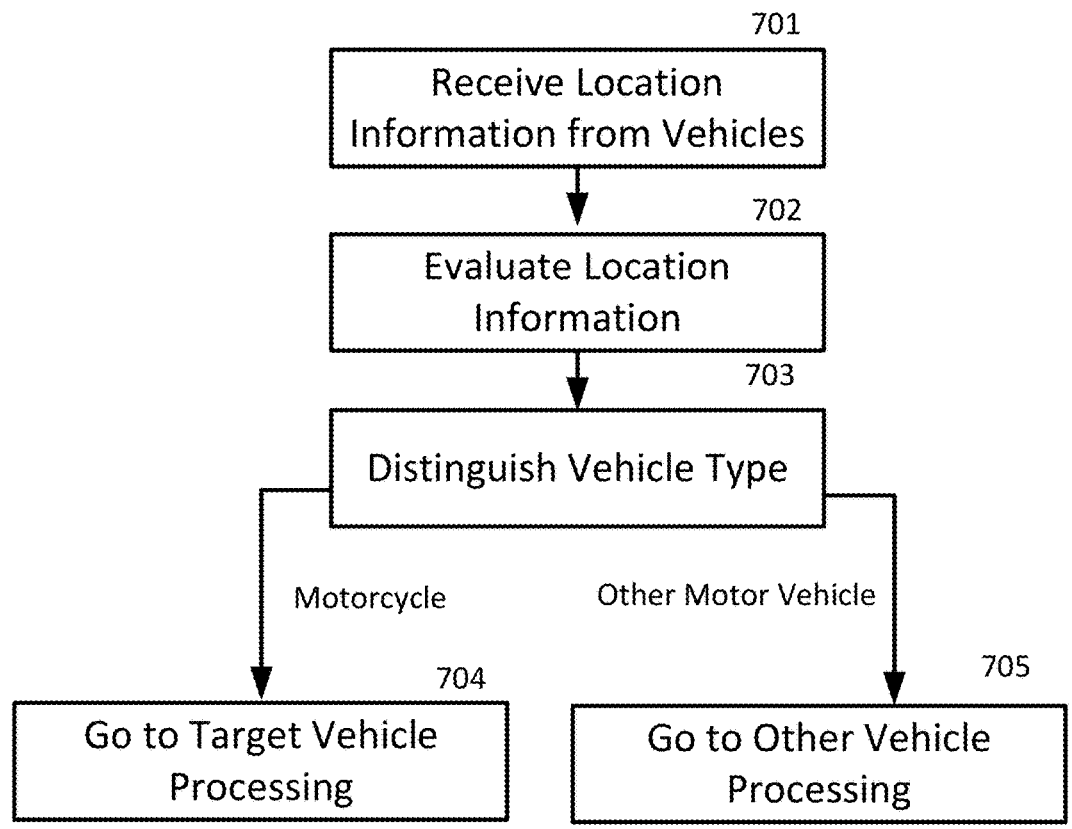
Fig. 7 Location Update

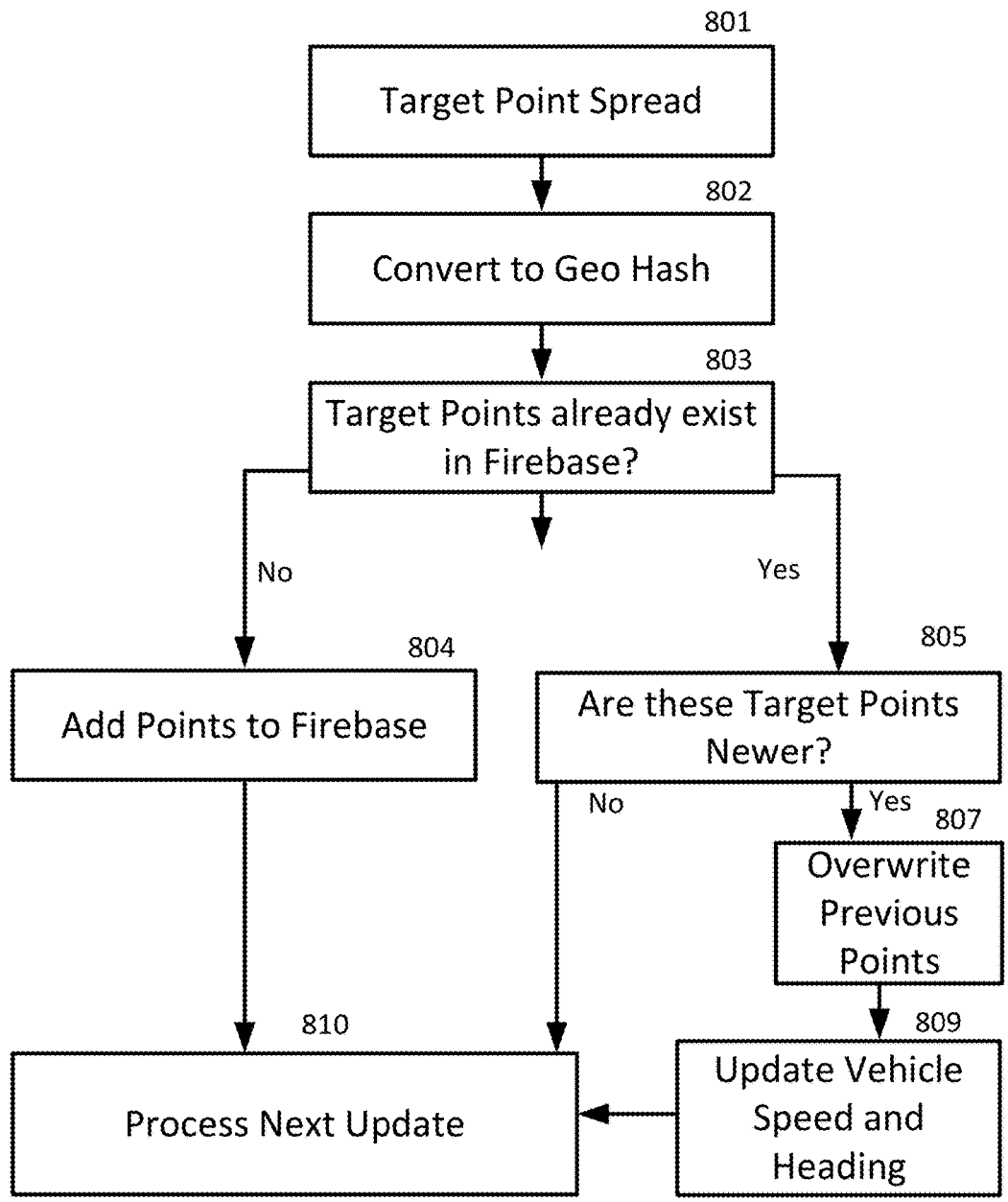
Fig. 8 Target Vehicle Process

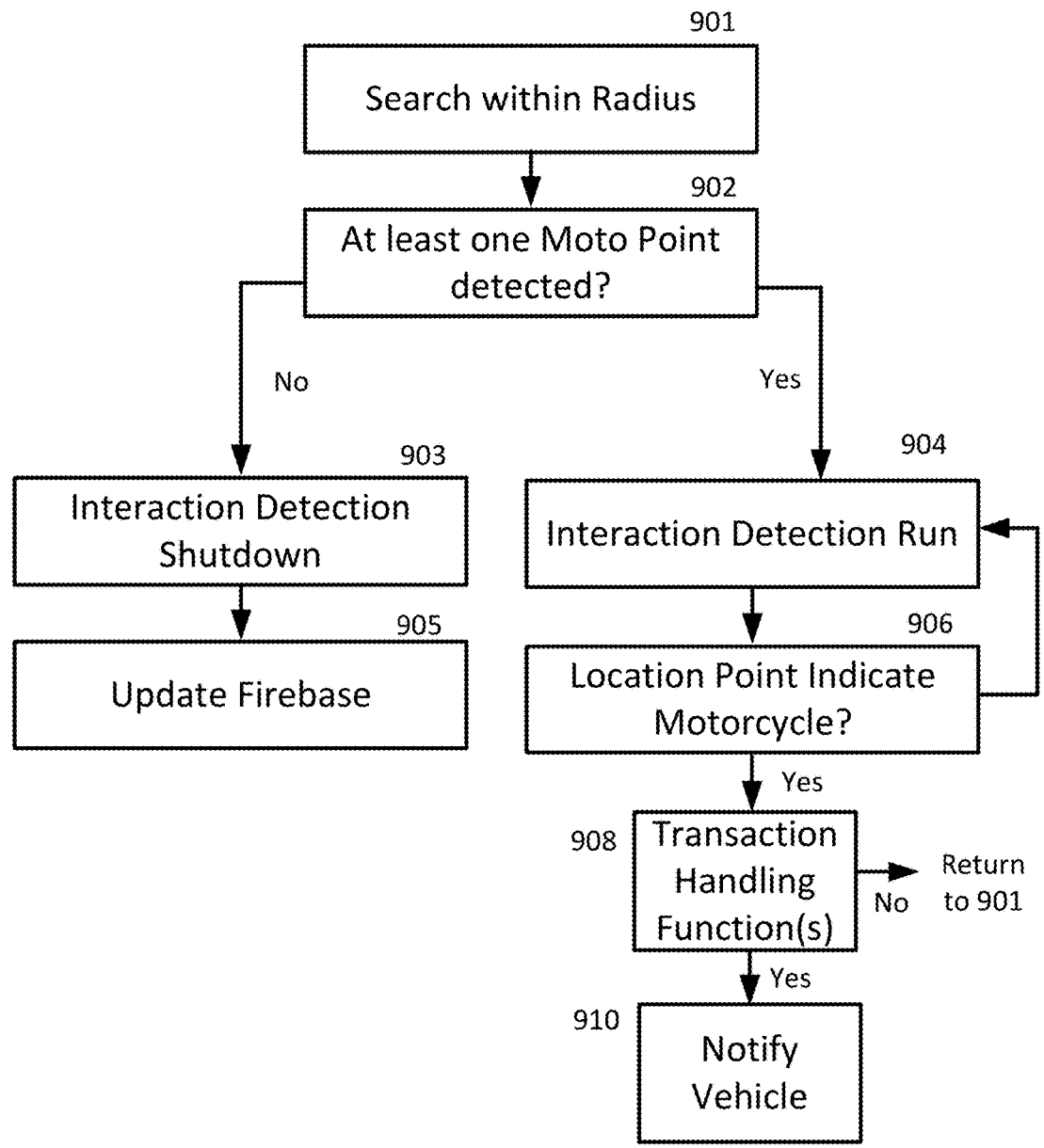
Fig. 9 Motor Vehicle Processing

PROXIMITY AWARENESS SYSTEM FOR MOTOR VEHICLES

RELATED APPLICATIONS

The present application claims priority to U.S. provisional patent application Ser. No. 62/114,236, titled "Proximity Awareness System for Cyclists," and filed Feb. 10, 2015, naming Brent F. Massey and Greg L. Rouleau as inventors. The forgoing application is incorporated herein by reference, in its entirety.

TECHNICAL FIELD

The present disclosure relates to vehicle safety systems, and more particularly to proximity alert systems.

BACKGROUND ART

It is known in the prior art to alert a motor vehicle operator to the presence of nearby vehicles by sensing such other vehicles with sensors, such as onboard vehicle radar systems. However, such systems are limited to detecting other vehicles that are within the sensor's range, typically within a few vehicle lengths.

SUMMARY OF THE EMBODIMENTS

Some embodiments provide a method of improving road safety for vehicles, which method includes receiving, at an interaction detector, a plurality of monitoring vectors from a plurality of vehicles travelling on one or more roads; determining, from the plurality of monitoring vectors, whether there is an interaction between the plurality of vehicles, an interaction determined when two of the plurality of vehicles are within a predetermined distance of one another such that the plurality of vehicles have a risk of collision, the interaction being determined without use of prior knowledge of the route of either of the two vehicles; and alerting an occupant of one of the plurality of vehicles if an interaction is determined. In some embodiments, the interaction detector is remote from the plurality of vehicles.

Other embodiments relate to autonomous vehicles. An embodiment of a method of operating an autonomous vehicle includes receiving, at an interaction detector, a plurality of monitoring vectors from at least an autonomous vehicle and a second vehicle; determining, from the a plurality of monitoring vectors, whether there is an interaction between the autonomous vehicle and the second vehicle, and interaction determined when the autonomous vehicle and the second vehicle are within a predetermined distance of one another such that the autonomous vehicle and the second vehicle have a risk of collision; and remotely controlling the autonomous vehicle, based on a detected interaction, to avoid a collision between the autonomous vehicle and the second vehicle. For example, the act of remotely controlling the autonomous vehicle may include sending instructions to a control system in the autonomous vehicle, to take an action selected from the group consisting of slowing the autonomous vehicle, stopping the autonomous vehicle, and performing an evasive maneuver to avoid a collision with the second vehicle.

Another embodiment provides a system including an interaction detector having a communications interface for receiving a plurality of monitoring vectors from a first vehicle and a second vehicle travelling on one or more roads; an interaction risk module configured to determine, from the plurality of monitoring vectors, whether there is an interaction between the first vehicle and second vehicle, an interaction determined when the first vehicle and second vehicle are within a predetermined distance of one another such that the first vehicle and second vehicle might have a risk of collision with one another; and a message generator configured to generate a message to at least the first in response to a determination, by interaction risk module, of an interaction, and to send the message to the first vehicle via a vehicle the communications interface. In some embodiments, in which the first vehicle is an autonomous vehicle, the message includes instructions to remotely control the first vehicle to avoid a potential collision between the first vehicle and the second vehicle.

BRIEF DESCRIPTION OF THE DRAWINGS

The foregoing features of embodiments will be more readily understood by reference to the following detailed description, taken with reference to the accompanying drawings, in which:

FIG. 2 schematically illustrates a base for detecting potential interactions among vehicles;

FIGS. 4A-4D schematically illustrate modes of operation of a system for detecting potential interactions among vehicles;

FIG. 7 schematically illustrates a flow chart for an embodiment of location update functionality of a proximity awareness system;

FIG. 8 schematically illustrates a flow chart for an embodiment of target vehicle processing of a proximity awareness system;

FIG. 9 schematically illustrates a flow chart for an embodiment of target vehicle search of a proximity awareness system.

DETAILED DESCRIPTION OF SPECIFIC EMBODIMENTS

Figure 1:
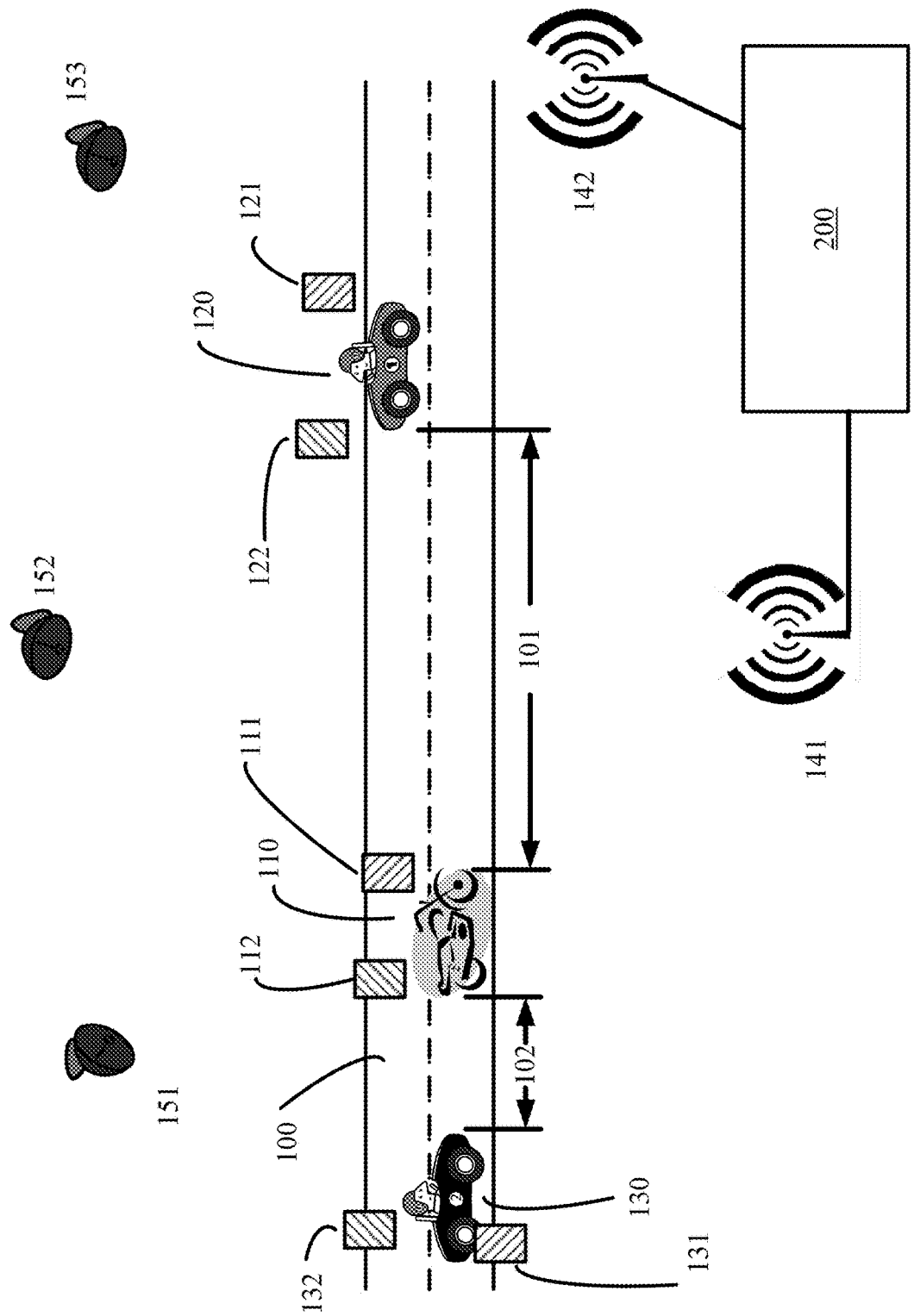
FIG. 1 schematically illustrates a scenario in which multiple vehicles may interact, as well as elements of a system according to one embodiment.

Various embodiments provide enhanced warnings of potential future adverse event (e.g., automobile crashes) by tracking the location and motion of multiple vehicles, and providing alerts or warnings to the drivers of such vehicles if the risk of an adverse event is identified. Some embodiments also control autonomous vehicles if the risk of an adverse event is identified. Generally, illustrative embodiments provide such warnings and/or control without the need for input from sensors that detect the vehicle's immediate environment. In various embodiments, systems and methods are able to identify a risk of collision sooner than a vehicle's on-board sensors, and indeed may identify a risk of collision between vehicles even when vehicle on-board sensors are unable to detect such a risk, for example because the vehicles are beyond a sensor's range, or line of sight. Various embodiments enhance road safety for vehicles traveling on a network of roads by reducing the risk of collision, for example by giving drivers ample warning of nearby vehicles, and/or by controlling vehicles to reduce a risk of collision. Consequently, safety is improved for the entire network of roads, and for the drivers on the network of roads.

Definitions. As used in this description and the accompanying claims, the following terms shall have the meanings indicated, unless the context otherwise requires:

The term "interaction" in reference to the location of a first motor vehicle relative to a second motor vehicle means that the two vehicles are within a predetermined distance (e.g., a "risk radius") of one another such that the two vehicles have a risk of collision. A "potential interaction" means that, within a predetermined time frame, the two vehicles may be within a predetermined distance of one another, for example such that the two vehicles have a heightened risk of collision. The predetermined time frame and/or the predetermined distance may depend, for example, on the speed of the vehicles. An interaction between two vehicles does not necessarily mean that two vehicles have a risk of collision, however, since for example the two vehicles could be traveling on adjacent roads that do not intersect, or that are separated by a barrier or other feature that would prevent the vehicles from colliding. In various embodiments, an act of determining whether two vehicles have an interaction, or a potential interaction, does not require prior (a priori) knowledge of, or use of such knowledge of, a pre-planned route that either vehicle is travelling or plans to travel, or the destination of such vehicles. In this context, a pre-planned route means a series of pre-planned steps to be taken by a vehicle in order to travel from one place to another (e.g., from a starting location to a destination). For example, when embarking on a trip, a driver may use maps, or a GPS-based navigation system as known in the art, to pre-plan a route from a starting point to a destination. The term prior (or a priori) knowledge does not refer to, or encompass, the fact or assumption that a vehicle moving on a road is likely to continue moving on that road in the immediate future, or a vehicle operator's intention (plan) to simply keep the vehicle moving on the road in the normal course of operating the vehicle. In addition, the term "destination" includes an end point of a route, or an intermediate point along a route.

The term "monitoring vector" in reference to a motor vehicle refers to characteristics of that vehicle's physical state at a specific time. For example, a monitoring vector may include all or some of the following characteristics: location, altitude, speed, direction or heading, and identity of road on which the vehicle is located, to name but a few examples. In some embodiments, a monitoring vector may include, but is not required to include, information from a vehicle's other on-board sensors, such as sensors that detect other objects near the vehicle, or in the vehicle's blind spot.

A "risk radius" is a vector extending outward from a vehicle, and which may be specified in units of distance (e.g., feet, meters, miles) or time (e.g., seconds), and/or some other combination of information in the vehicle's monitoring vector. A given vehicle may have more than one risk radius. For example, a given vehicle traveling in a first direction may have a first risk radius relative to a first vehicle behind the given vehicle and traveling in the same direction, and a second risk radius relative to an oncoming second vehicle traveling in the opposite direction, which second vehicle is closing the gap between the two vehicles. In some situations, a risk radius may define a circle around a vehicle, but in other situations the risk radius may define an irregularly shaped area around the vehicle.

An "autonomous vehicle" is a vehicle that is capable of navigating without human input, and may be known as a "self-driving" vehicle, for example via an on-board control system. Examples of autonomous vehicles include, but are not limited to, any of a number of vehicles tested by Google X, or that participate in the DARPA Grand Challenge, to name but a few examples. Some autonomous vehicles are also capable of responding to human input. Some autonomous vehicles may be remotely controlled, for example by receiving information from a remote source (i.e., rather than from sensors onboard the vehicle) and then determining how to react to that information and executing the determined reaction. The information from a remote source may include, for example, information about the autonomous vehicle's environment (e.g., other vehicles in the environment), or information about specific actions to take (e.g., slow down; stop; change to an alternate route).

FIG. 1 schematically illustrates a scenario in which multiple vehicles (110, 120, 130) may interact while on a road 100, as well as elements of a system according to one embodiment. In this embodiment, vehicle 110 is a motorcycle, and vehicles 120 and 130 are automobiles, although various embodiments are not limited to such vehicles, and instead may be applied to any combination of moving vehicles including bicycles, trucks, and autonomous vehicles, to name but a few examples.

As shown in FIG. 1, the motorcycle 110 is separated from automobile 120 by a distance 101, but as the motorcycle 110 and automobile 120 move along the road 100, the gap 101 will shrink, increasing the risk of a collision between them. For example, a collision may occur if one of the vehicles 110, 120 crosses the centerline of the road 100 into oncoming traffic, for example due to negligence, or as an intentional act of turning.

Motorcycle 110 carries a location-monitoring device 111, and a communications device 112 for communicating with a base 200, which may be referred to as a "back end."

The location-monitoring device 111 may be a Global Positioning System ("GPS") device that calculates its position relative to GPS satellites (e.g., satellites 151, 152, 153), or a device that calculates its position relative to one or more cellular telephone antennae (e.g., 141, 142). The GPS satellites and/or cell towers may be considered to form elements of a network of roads. The location-monitoring device 111 may also determine whether the motorcycle 110 is on a road, and if so, the name or number of that road. That information, or a subset of that information, and optionally in addition to the time at which that information was gathered (a "time stamp"), makes up the monitoring vector of the motorcycle 110. Such information may be referred to as "telemetry data."

The communications device 112 may be a cellular telephone as known in the art, or other device capable of wirelessly communicating with the base, such as a radio for example. The communications device 112 is in communication with the location-monitoring device 111 to receive from the location-monitoring device 111 information relating to or defining (at least in part) the monitoring vector of the motorcycle 110. For example, the communications device 112 and the location-monitoring device 111 may be coupled by a wireless connection, such as via a Bluetooth connection, for example.

Although the location-monitoring device 111 and the communications device 112 are schematically illustrated by distinct graphical elements, in some embodiments, these devices may instead be a single device. For example, many contemporary cellular phones have the functionality of both devices 111 and 112. A device that can both determine a vehicle's location (and other data in a monitoring vector) and communications capacity as described above may be referred to as a "mobile unit."

The other vehicles (120, 130) also carry location-monitoring devices (121 and 131, respectively) and communications device (122 and 132, respectively) and in each case may also be separate devices or a single device.

The operation of an embodiment will be described below in connection with the motorcycle 110 and automobile 120. In operation, the location-monitoring device 111 of the motorcycle 110 periodically updates the information that makes up the motorcycle's monitoring vector, and provides that information (monitoring vector) to the communications device 112. The communications device 112, in turn, relays the information to the base 200. The base 200 may be remote from the communication device, and not on-board a vehicle. For example, the base 200 may be several kilometers from the communications device 112, and/or out of visual range from the communications device 112. Such communication may be via cellular telephone antennae 141 and 142, for example, as is generally known from the field of cellular communications. The communications device 112 may also send information describing the communications device 112 and/or the location-monitoring device 111, so that a message may be provide to those devices in a format suitable to such devices.

Similarly, the location-monitoring device 121 of the automobile 120 periodically updates the information that makes up the monitoring vector of automobile 120, and provides that information (monitoring vector) to the communications device 122. The communications device 122, in turn, relays the information to the base 200.

In operation, the systems and methods described herein send, receive, and process monitoring vector data on a time scale that permits systems to send messages to at least one vehicle involved in an interaction. For example, vehicles may send updated monitoring vectors to a base once per second, and the base may execute processes described herein to send a message within one second of receiving a monitoring vector. Consequently, systems and methods described herein may be described as operating in "real time."

Figure 3A:
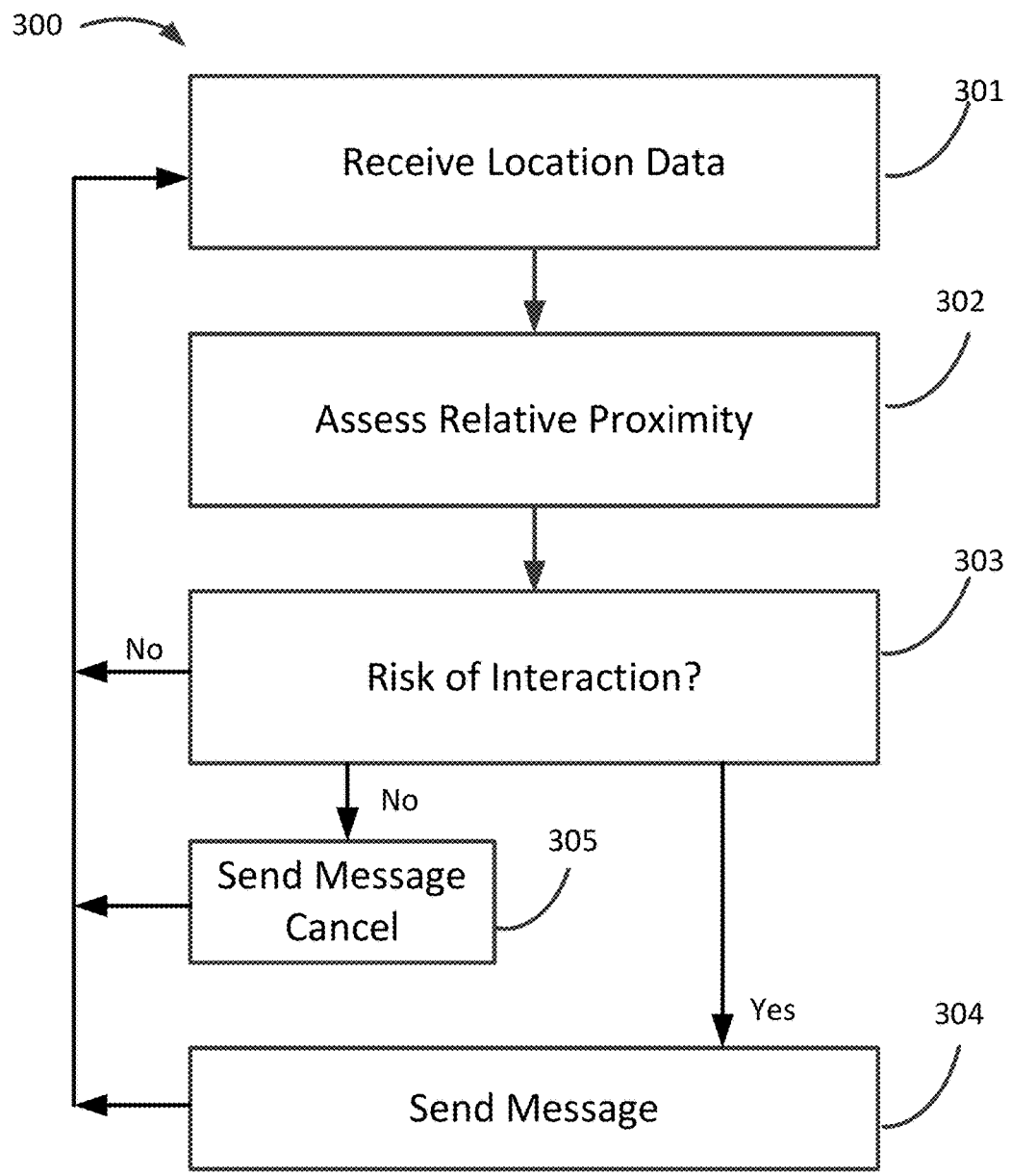
FIGS. 3A and 3B schematically illustrate methods for detecting potential interactions among vehicles.

An embodiment of the base 200 is schematically illustrated in FIG. 2, and is configured to execute a process 300 as schematically illustrated in FIG. 3A. The base 200 may be, or include, a computer such as a server having one or more processors (e.g., microprocessors) programmed to executed some or all of the processes described herein, as well as data storage memories, monitors, keyboards, printers, input/output devices, communications interfaces, etc.

At step 301, the base 200 receives the monitoring vectors from motorcycle 110 and automobile 120. To that end, the base station 200 may have a communications module 210. The communications module 210 may receive data (e.g., monitoring vector data) from a vehicle via a telephone connection such as through cellular antennae 141, 142, or through radio signals, or other telecommunications methods.

At step 302, the base 200 then uses the information from those monitoring vectors to assess the relative proximity of the motorcycle 110 and automobile 120, at step 302. In some embodiments, step 302 may determine the location of each vehicle from which monitoring vectors are received (e.g., motorcycle 110 and automobile 120), and then use that information to determine the proximity the vehicles (e.g., the time or distance separating one vehicle from the other). Alternately, step 302 may determine the relative proximity of the two vehicles without first determining the actual location of each, for example by determining the distance between location data provided by each vehicle's GPS unit. The base 200 may have one or more proximity modules 220 for this purpose.

At step 303, the base station determines whether the motorcycle 110 is within the risk radius of the automobile 120. The base 200 may have an interaction risk module 230 configured to perform such functions. Consequently, in some embodiments, an interaction, potential interaction, or risk of collision among vehicles, may be detected remotely (e.g., not on-board) from the vehicles themselves.

If so, the base station sends a message to the automobile 120 to inform the driver of automobile 120 that the driver should be aware that there is a motorcycle (i.e., 110) sufficiently close to the automobile 120 that the driver should exercise heightened vigilance for a possible collision with the motorcycle 110. The system 200 may have a message generation module (or alert generation module) 240 to configure a message to be sent to one of the vehicles, and/or to a driver or other occupant of one of the vehicles. For example, a message may cause a cell phone in an automobile (e.g. 120) to make a warning sound, or even play a spoken warning message. The message may simply indicate that another vehicle (e.g., motorcycle 110) is within the risk radius, or may provide additional information, such as the range and direction of the other vehicle. In some embodiments, a message may cause a display screen within a vehicle to display information about the other vehicle, such as a map showing the relative location of the other vehicle, or an arrow pointing in the direction of the other vehicle. In some embodiments, the message may cause a tactile signal, such as causing a vehicle's steering wheel to vibrate. The system 200 may then employ communications module 210 to send such a message to one or more vehicles. Otherwise, the process returns to step 301 to await updated motion vectors.

In some embodiments, the message may include instructions for controlling the autonomous vehicle, for example to avoid a collision between an autonomous vehicle and a second vehicle. For example, the instructions may be sent to a control system in the autonomous vehicle, and cause the autonomous vehicle to take an action such as slowing the autonomous vehicle, stopping the autonomous vehicle, causing the autonomous vehicle to change lanes, or pull into a breakdown lane, exit the road on which the autonomous vehicle is travelling when it receives the message instructions, change its route to its destination, delay a maneuver that might lead to a collision (e.g., delay turning across a lane of traffic in which a motorcycle is traveling, and to perform an evasive maneuver to avoid a collision with the second vehicle, to name but a few examples.

The processes implemented at the base 200 may be referred to as "back-end" processes or "back-end" services. These processes will need to be performed by a persistent process that watches for telemetry updates, performs the searches, calculates the interactions, and triggers the notifications. In some embodiments, some or all of these back-end processes may be performed using a service like IronWorker or by using raw computing platforms from Amazon. Once the back-end services detect that a notification needs to be sent, the message may be sent using Amazon SNS to send the notifications to the devices via Apple Push Notification or Google Cloud Messaging, to name but a few examples.

In some embodiments, if a message is sent, the system may continue monitoring the relative locations of the motorcycle 110 and automobile 120 and send a follow-up signal (Step 305) to indicate that the automobile 120 is no longer within the risk radius of the motorcycle 110.

Figure 3B:
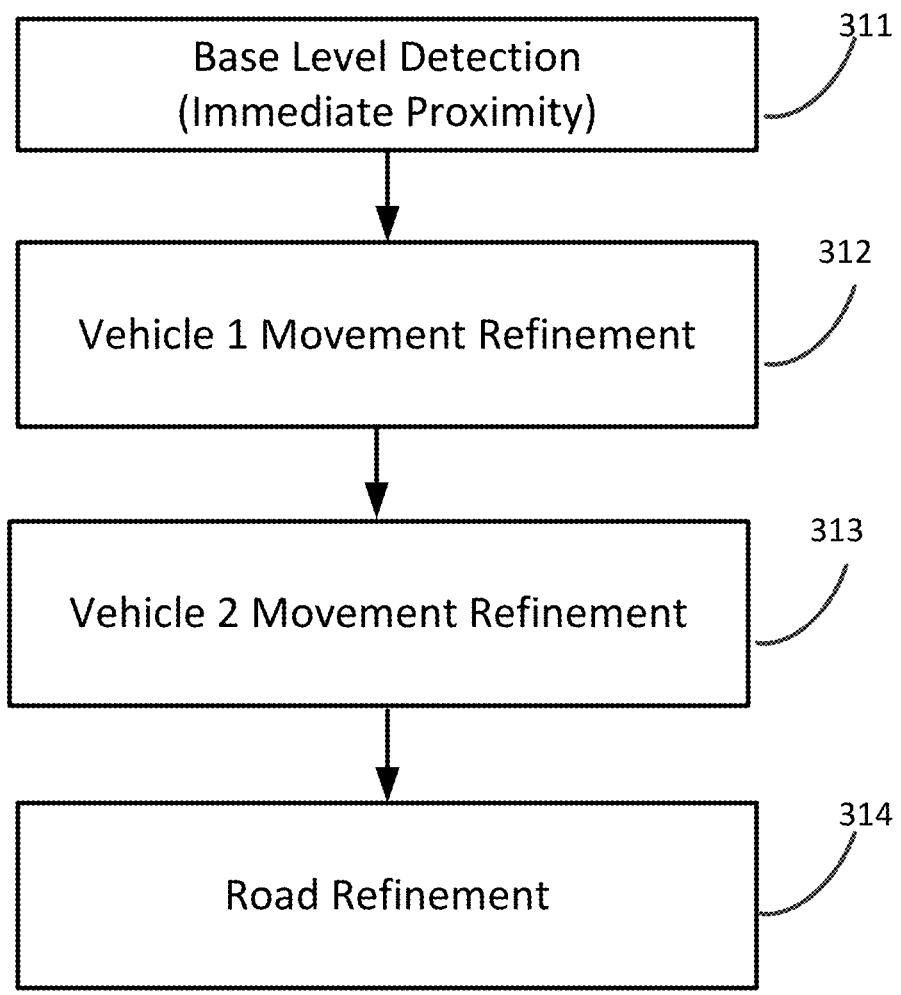

The step 302 of monitoring vectors to assess the relative proximity of the motorcycle 110 and automobile 120 may take a variety of embodiments, as schematically illustrated by FIG. 3B.

Base Level Detection

In a simple embodiment, the step 302 of monitoring vectors to assess the relative proximity of the motorcycle 110 and automobile 120 may include simply assessing the distance (physical distance or time distance) between them (step 311). This embodiment is schematically illustrated in FIG. 4A, and may be referred to as "base level detection."

As shown in FIG. 4A, a first vehicle (in this example, automobile 120) and a second vehicle (in this example, motorcycle 110) are each traveling through an interconnected network of roads. The automobile 120 has a risk radius 401 that defines an area bounded by a risk parameter 402. If the motorcycle 110 comes within the risk radius 401 of the automobile 120, for example due to motion of the automobile 120, the motorcycle 110, or both, then the system 200 will send a message to the automobile 120, and specifically will send a message to the communications device 112 which will, either by itself or in conjunction with another device (e.g., and automobile's on-board electronics, such as its GPS system, for example) respond to that message by notifying the driver that a first vehicle (i.e., motorcycle 110) is nearby. Consequently, the safety of the network of roads is enhanced.

Car Movement Refinement

In another embodiment, the step 302 of monitoring vectors to assess the relative proximity of the motorcycle 110 and automobile 120 may include altering the size of the risk radius 401 and the position of the automobile 120 within the risk radius 401 based on speed and direction of the vehicles (110, 120), and/or GPS accuracy, at step 312. This embodiment is schematically illustrated in FIG. 4B, and may be referred to as "car movement refinement."

Figure 4B:
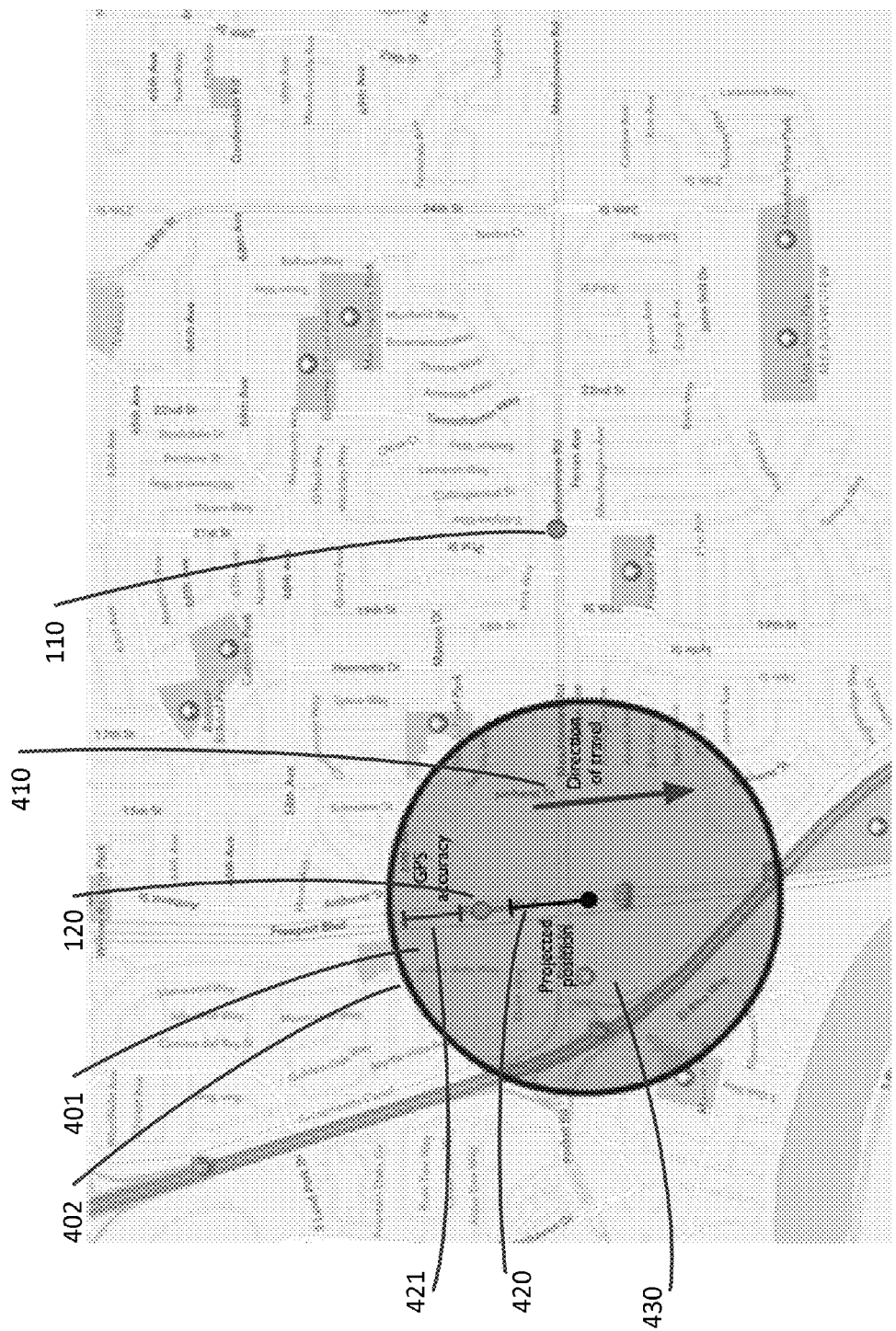
Figure 4D:
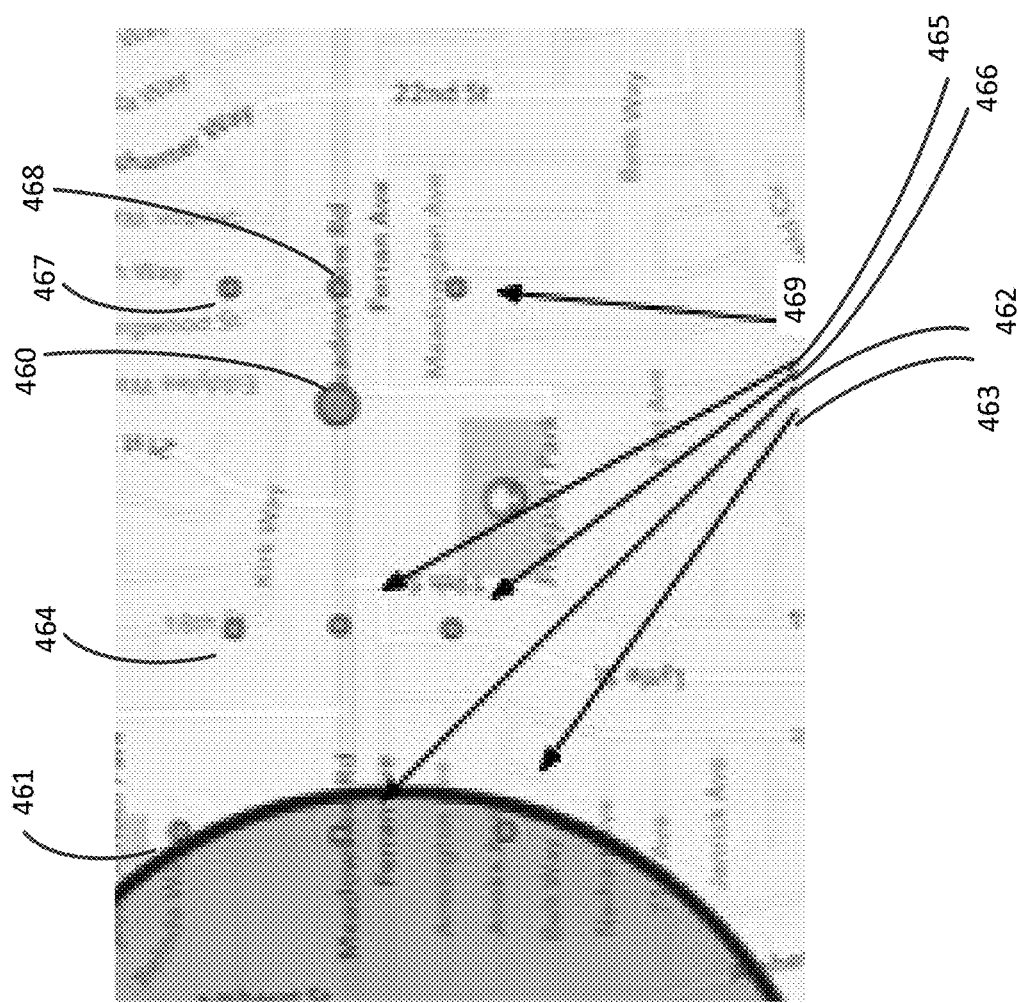

In FIG. 4B, the data representing the location of the automobile 420 is altered by adjustments 420 and/or 421, to account for errors by the automobile's GPS unit (122), or to account for possible changes in that data that may have occurred during any time lag in the receipt by system 200 of the motion vector from the automobile 120. As schematically illustrated in FIG. 4B, the risk radius 402 may be defined (e.g., larger than it would otherwise have been, if based only on the position of the automobile 120) as extending not just from the location of the automobile 120, but from any or all points along the adjustments 420 and/or 421. In this way, the risk radius 401 is appropriate even if the presumed position of the automobile 120 is incorrect or inexact.

In some embodiments, for example if communications with the automobile 120 is lost, the system may predict one or more projected positions 430 for the vehicle at a present time, and use such a projected position from which to extend a risk radius 401. Alternately, even if the presumed position of the automobile 120 is known with confidence, some embodiments may predict one or more projected positions 430 for the vehicle 120 at a future time, and use such a projected position from which to extend a risk radius 401 at a future time.

Motorcycle Movement Refinement

In another embodiment, the step 302 of monitoring vectors to assess the relative proximity of the motorcycle 110 and automobile 120 may include projecting (or predicting) the potential location(s) of the motorcycle 110 to account for movement and GPS accuracy (step 313). This may be done, for example, by creating a "fan" of points 450 in front of the motorcycle based on its direction of travel, speed, and accuracy. Several points are also placed behind the motorcycle 110 to account for GPS inaccuracy. Although this embodiment schematically illustrates nine points (461, 462, 463, 464, 465, 466, 467, 468 and 469) in fan 450, in the fan of points 450 may include any desired number of points, which may be directly in-front of the motorcycle 110 (e.g., 462, 465), in front and offset to the side (e.g., 461, 463, 464, 466), or directly behind (e.g., 468), or behind and offset to the side (e.g., 467, 469), or any combination or arrangement of points of in-front of, behind or to the side of the motorcycle 110. In general, as many points as needed can be added to completely encircle the motorcycle 110. If any of these points intersect (i.e., are on the risk perimeter 402 or are within the risk radius 401 (here, illustrated as a circle) of the automobile 120, such as points 450A for example, then there is the potential for an collision and a notification is sent to the automobile 120. This embodiment is schematically illustrated in FIG. 4C, and may be referred to as "bike movement refinement."

Road Refinement

In another embodiment, the step 302 of monitoring vectors to assess the relative proximity of the motorcycle 110 and automobile 120 may include determining whether an adverse interaction between the two vehicles is even possible (step 314), and if not, then omitting the step of sending a message (step 304), even if the motorcycle 110 is within the risk radius of the automobile 120. In one embodiment, the base 200 searches Open Street Map's database (or other open-source or proprietary map software) for the positions of both the automobile 120 and motorcycle 110. For example, this query may be performed using a mapping application, such as the OSM Overpass API ("Overpass"). To perform "map matching," this API is given a search box (which will be defined by GPS accuracy of the most recent telemetry points (monitoring vector) for both the automobile 120 and motorcycle 110), it then returns a list of the roads and their properties inside that box.

Using the identified roads, the base examines the properties for the roads it thinks the vehicles are on to determine if the interaction is possible. For example, if two vehicles are on the same road, or on roads that intersect at a point that lies on the path of two vehicles, then a collision between the two vehicles is possible.

For example, if the motorcycle 110 is traveling along Main St. near the intersection of Main St. and 2nd Ave, and the automobile 120 is near the intersection of Main St. and 4th Ave, then the process can conclude that both vehicles 110 and 120 are traveling on Main St. The base 200 may then look at the properties for the roads it thinks the vehicles are on to determine if the interaction is possible.

For example, if the vehicles 110 and 120 are traveling in different directions, the base 200 will determine whether either vehicle is on a protected or divided freeway (for example, a freeway with divided lanes, such that the lanes in which the vehicles are traveling do not intersect or otherwise provide an opportunity for the two vehicles to collide). If either one is, then the vehicles cannot collide so the notification will not be sent.

Alternately, the system may determine that the motorcycle 110 is traveling along a first street and that the automobile 120 is traveling along a second street that passes over the first street on an overpass. Since the automobile 120 may pass directly over the motorcycle 110, there is no risk of collision even though the two vehicles are in very close proximity to on another, and so the notification will not be sent.

Other Scenarios

FIG. 1 also schematically illustrates a different scenario, in which a first vehicle (in this case, motorcycle 110) is followed closely by another vehicle (automobile 120). In this scenario, a motorcyclist on motorcycle 110 is cruising down a road 100 and sees traffic building up in front of him/her and begins to slow down. A distracted driver in car 130 does not notice the traffic buildup and fails to slow down, thereby hitting the cyclist. Many drivers are less aware of motorcycles than they are of other vehicles. If a motorcyclist slows down or has to make a sudden stop and the (driver of the) car behind does not notice, the car behind could end up hitting the motorcyclist from behind. In this scenario, the system sends the driver of car 130 a message signaling that there is a motorcyclist in front of them, thereby making the driver of car 130 aware of the motorcyclist's actions.

FIGS. 5A-5H schematically illustrate other scenarios for various embodiments.

Figure 5B:
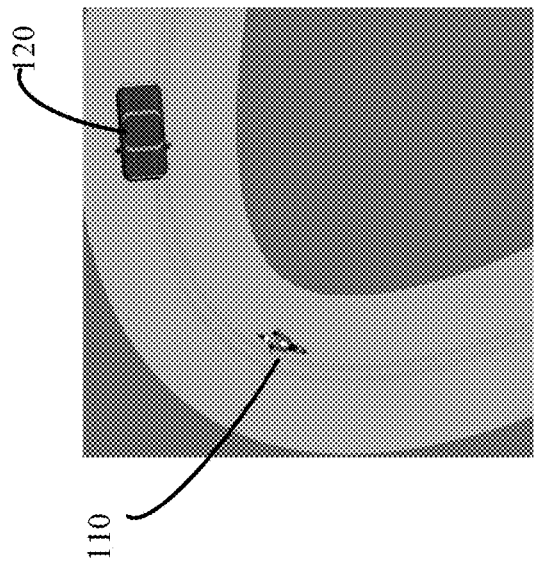
FIGS. 5A-5G schematically illustrate scenarios for detecting potential interactions among vehicles.
Figure 5A:
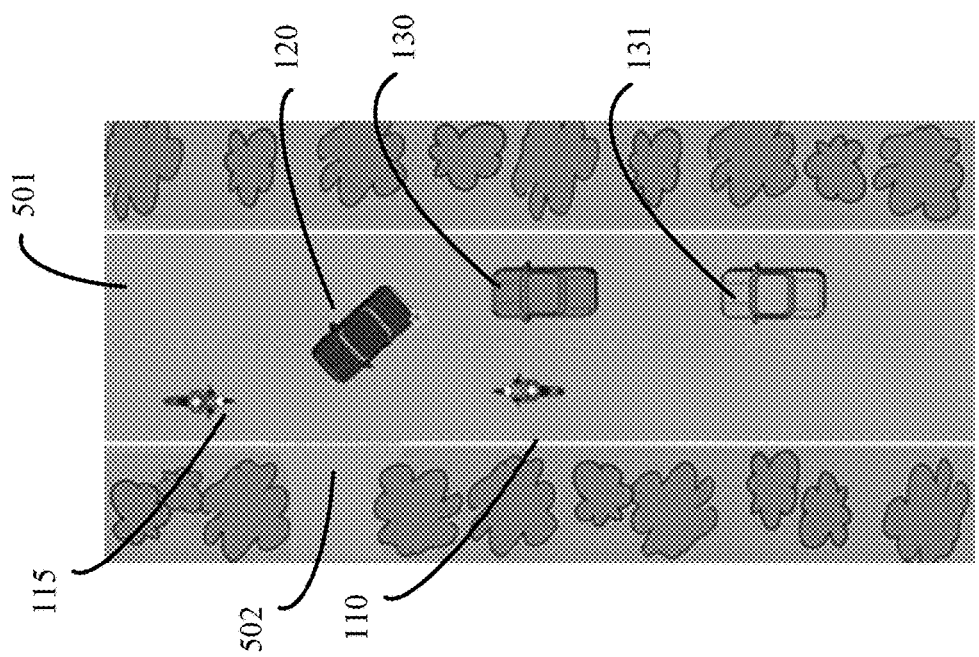

FIG. 5A: Car Making Left-Hand Turn

In FIG. 5A, a motorcyclist 110 is riding in a rural area on a two-lane road 501, and is stuck behind three cars (121, 130, 131) moving at 35 mph in a 55 mph passing zone. The motorcyclist signals, check his/her mirror and blind spot, pulls out to pass and accelerates. As the motorcyclist comes alongside the row of cars (121, 130, 131), a risk of collision between the motorcycles 110 and one of the cars increases, for example if the lead car 120 turns into a driveway 502 coming up on the left.

In such a scenario, the base 200 will send a message to the driver of the lead car 120, indicating that a motorcyclist is approaching from a behind.

Alternately, a motorcyclist 115 is riding in the opposite direction on the road 501. From the perspective of motorcyclist 115, the car 120 is turning in front of the motorcyclist 115, into the path of motorcyclist 115. In such a scenario, the base 200 will send a message to the driver of the lead car 120, indicating that a motorcyclist is approaching from ahead.

Alternately, if the lead care is an autonomous car, a message from the base 200 may cause the car to slow or stop, and wait for the motorcyclist to pass the position of the lead car 120.

FIG. 5B: Cornering

In FIG. 5B, a motorcyclist 110 is riding on a curving, two-lane road and rounds a right-hand curve causing the bike to begin to drift outward, with the wheels almost touching the centerline. An oncoming car 120 appears rounding the corner, straddling the same centerline. This presents a danger in that, when traveling in opposite directions, a car and motorcyclist cannot see one another because they are located around a bend. As they take the corner, each drifts closer to one another causing a head on collision. In such a scenario, the base 200 will send a message to the driver of the lead car 120, indicating that a motorcyclist 110 is approaching from the front. This message should prompt the driver, or the control system of an autonomous vehicle, to slow, stop, change lanes, or even pull over, until the risk of collision has passed. Consequently, the safety of the network of roads is enhanced.

FIG. 5C: Braking

Figure 5C:
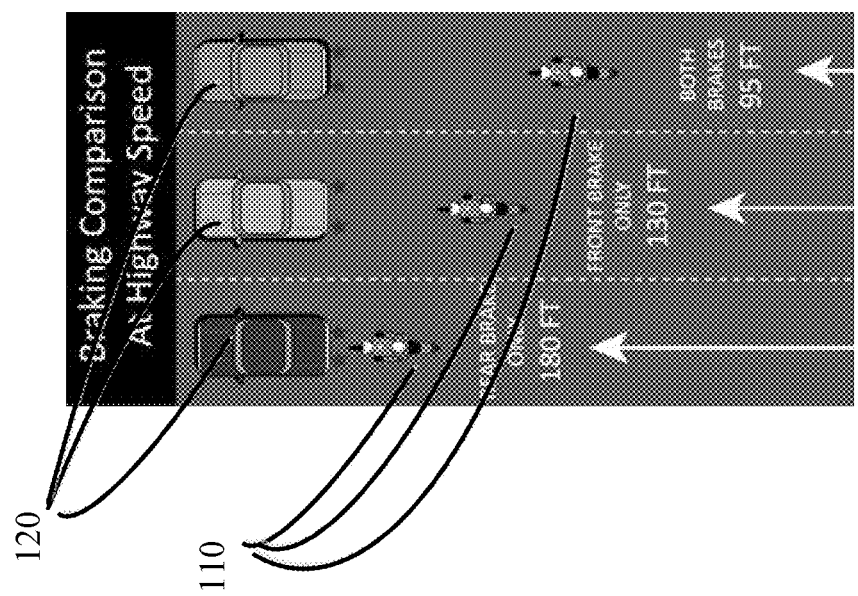

In FIG. 5C, a motorcyclist 110 is riding on an Interstate freeway at 65 mph in traffic. Momentarily distracted by close calls and other events on the road going on behind them, the motorcyclist 110 notices traffic is coming to a complete standstill in all three lanes in front of them. The motorcyclist 110 is traveling too fast to stop in time and will run into the back of a vehicle (120) at high speed. In such a scenario, the base 200 will send a message to the driver of the lead car 120 and/or the motorcyclist 110, indicating that a motorcyclist 110 is approaching from the rear.

Figure 5E:
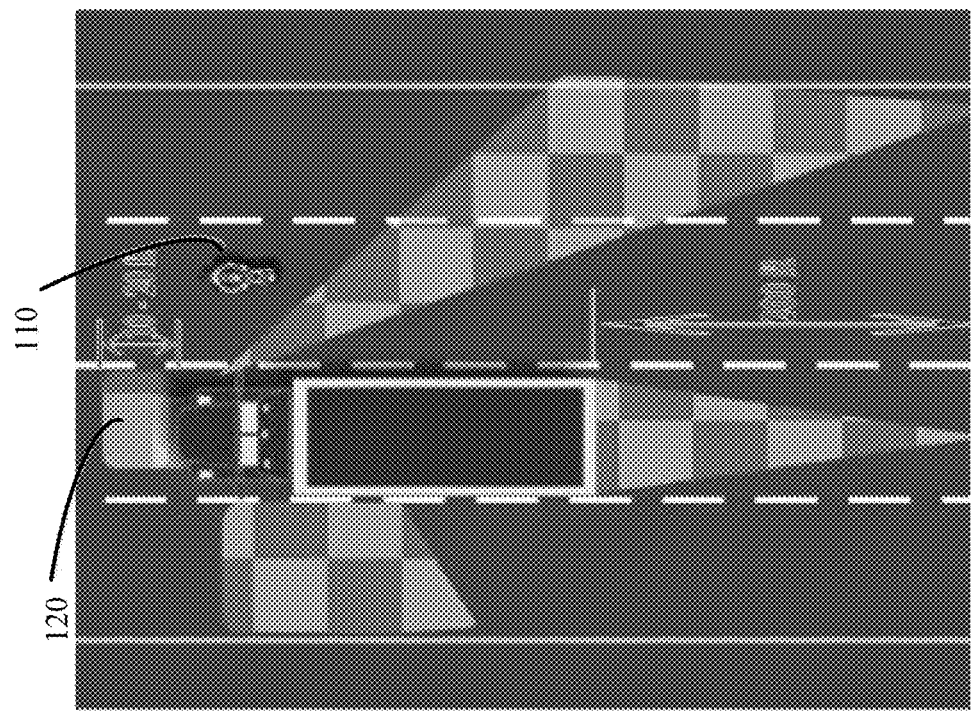
Figure 5D:
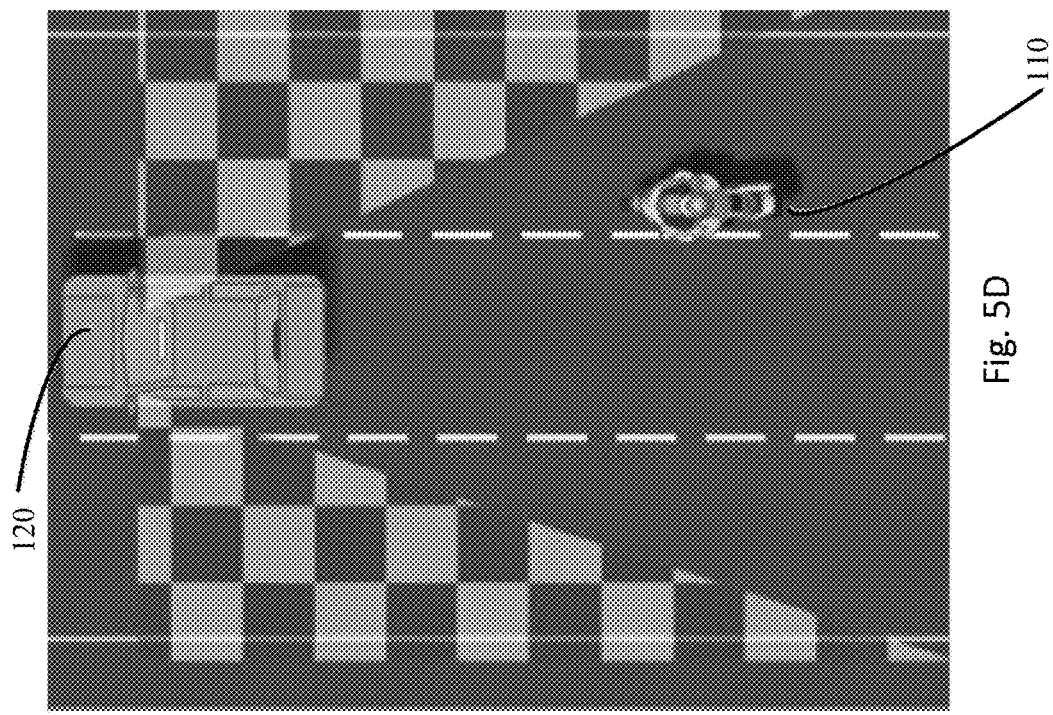

FIGS. 5D and 5E: Blind Spot

Many drivers don't bother to check their blind spot before switching lanes, and due to the smaller size of a motorcycle a driver will often unknowingly move into the motorcyclist's space. This presents a risk that a motorcyclist 110 cruising down the highway finds him/herself in a lane that is about to be taken over by a vehicle 120 (e.g., and automobile, SUV, or truck, etc.) because they are in the vehicle's blind-spot.

In such a scenario, the base 200 sends the driver of the vehicle 120 a message signaling that there is a motorcyclist in the vehicle's proximity.

Figure 5G:
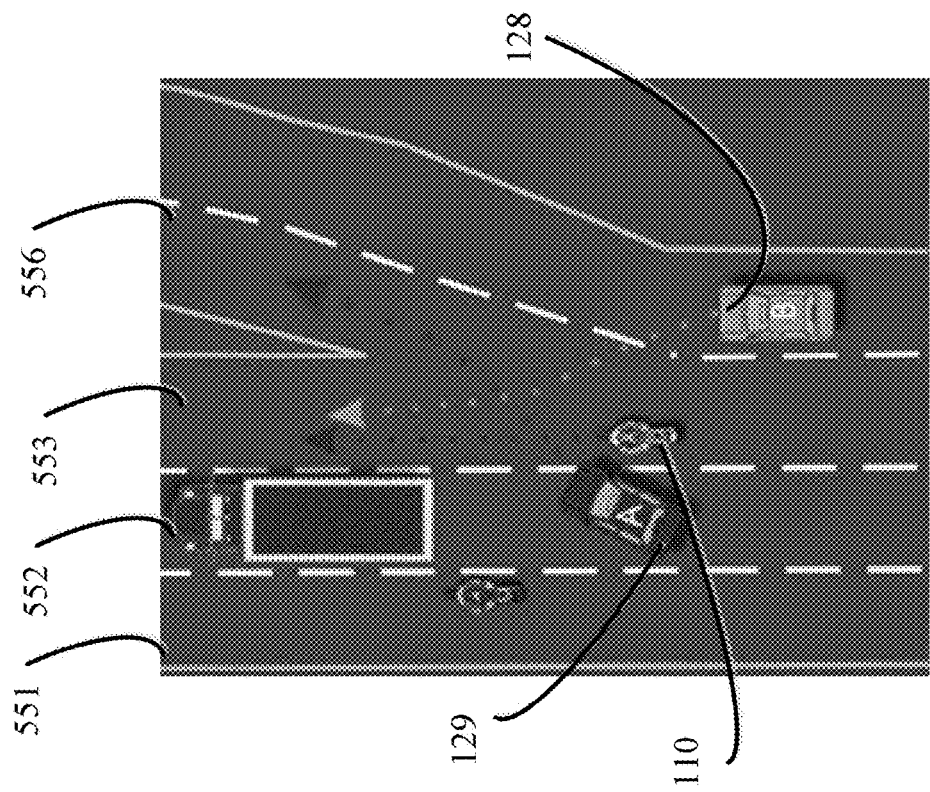
Figure 5F:
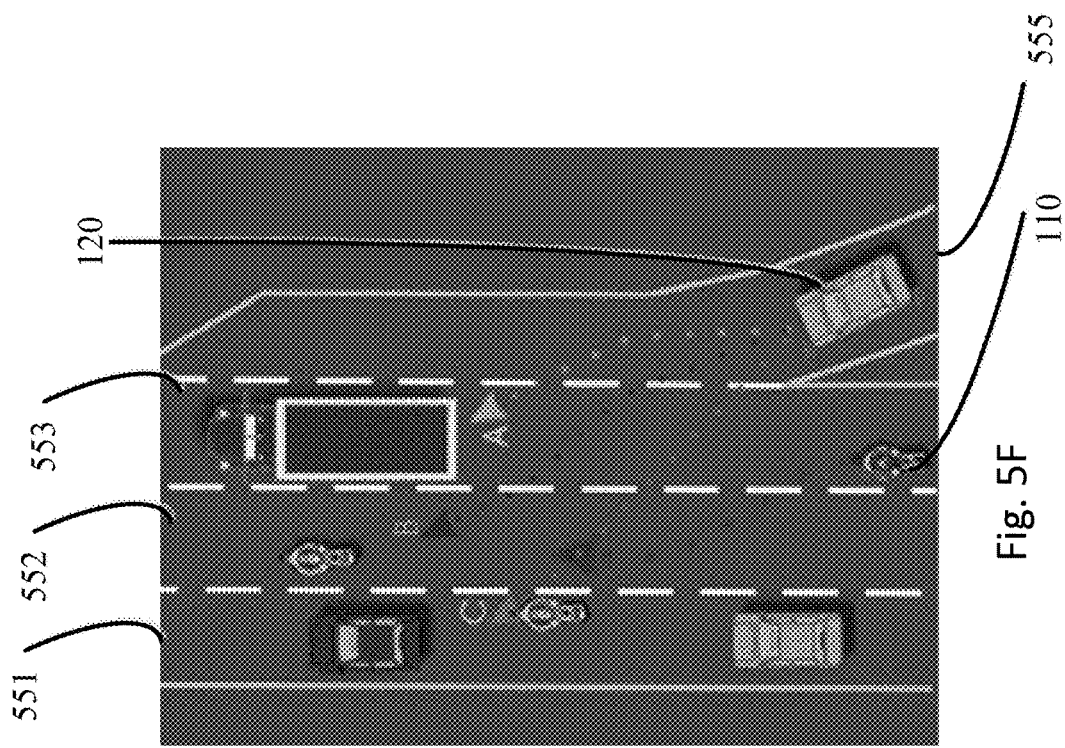

FIGS. 5F and 5G: On Ramps and Off Ramps

Drivers can often make impulsive decisions when entering and/or exiting the highway, skipping several lanes of traffic to either get into the fast (or "passing") lane (car 120), catch their exit (car 129), and/or get out of the exit lane 553 (car 128). These maneuvers are often done quickly and impulsively, leaving motorcyclists vulnerable to simply "not being seen."

This presents the risk that a motorcyclist 110 sees an on ramp and moves over to the center lane 552 or left lane 551 to give the car 120 space to enter the roadway, as schematically illustrated in FIG. 5F. As the car (120) enters the highway he/she notices that there is a truck in the collector lane 553 and immediately aims to enter the passing lanes (552, 551) to the left, overtaking the motorcycle's (110) space.

In FIG. 5G, the driver of a car (129) realizes that he/she is about to miss his/her exit 556 and decides to cut across multiple lanes of traffic (552, 553) in order to make it, cutting in front of or overtaking a motorcyclist's (110) space.

In such scenarios, the base 200 sends the driver of a car 129 a message signaling that there is a motorcyclist (110) in the vehicle's proximity, which will cause a driver of a car (e.g., 128; 129) to re-think their impulsive move and actively look around them.

FIG. 1: Car Approaching from Behind

A motorcyclist 110 is cruising down a road and sees traffic building up in front of him/her and begins to slow down. A distracted driver 130 does not notice the traffic buildup and fails to slow down, hitting the motorcyclist 110.

Many drivers are less aware of motorcycles than they are of other vehicles. If a motorcyclist slows down or has to make a sudden stop and the car behind doesn't notice, they could end up hitting the motorcyclist from behind. In such a scenario, the base 200 sends a message to the driver of the car 130 signaling that there is a motorcyclist 110 in front, thereby making the driver of care 120 aware of motorcyclist's actions.

Other Potential Features

A. Movement Detection

In some embodiments, it is expected that some motorists (e.g., motorcycle drivers) will manually start their devices (e.g., an app on a smart phone) to indicate they are going to be operating in "bike mode" (i.e., a mode in which the location-monitoring device 111 and the communications device 112 operate to transmit to the base 200 the monitoring vector of motorcycle 110).

It is also expected that car drivers will not manually start the app and that notifications should arrive whenever they are driving regardless of when they last opened the app. These constraints mean that the back-end (base 200) will continually receive telemetry updates from drivers even when they aren't actually in the car. It may be desirable to avoid notifying someone who is at home in their living room every time a motorcycle drives by their house. To that end, some embodiments include the features described below.

B. Trip Start (Car)

The back-end at base 200 will process all monitoring vectors coming from a device, and if two consecutive updates have a speed report in excess of some pre-set speed (e.g., in excess of 5 mph, 10 mph, 15, or 20 mph, or other speed, to name but a few examples), then the back-end (200) will indicate that that device is currently in a car and should receive messages (i.e., the device should be put into "car mode"). This will set a mode flag in the data store of the base 200 so the algorithms will know to process that device's monitoring vectors.

C. Trip Start (Motorcycle)

Motorcycle drivers will manually start the app and indicate that they are in bike mode. When in that mode, monitoring vectors from their device will generate the extra projected points described above (e.g., a "fan" of points 450 as schematically illustrated in FIG. 4C) and the algorithms will include those points in the searches run for nearby cars.

Some embodiments may employ a sensor (e.g., a gyroscope, accelerometer, or other sensor) on the device to detect more tilting of the device than would be expected of a moving car. The basic idea is that a motorcycle leans enough, upon initiation of a ride, or during turns for example, that the motorcycle driver's phone will register more tilt than that of a car driver who has their phone in their pocket, cup holder, purse, etc. In such an event, then the back-end (200) would send a notification to the device that effectively says "we think you are driving a bike but didn't start your monitoring equipment in bike mode." If there is no response from the user, then the device will be put into "bike mode" (i.e., it will send monitoring vectors to the base 200, and in some embodiments, it will not receive messages from the base), otherwise the device will be put into car mode.

D. Trip End

Automatic detection of the end of a trip is more complicated because a person getting out of their car and walking around a store would have a similar GPS profile to someone who is stuck in traffic. As such, some embodiments give the user options any time an interaction notification arrives. For example, in some embodiments, a lack of movement for a given amount of time (for example, 10 minutes) may halt the system automatically.

First, the user can simply indicate "I've arrived" or "End Trip" or "End Ride" using the application on their device 111 If they do this, then the device 111 sends (via communication device 112) a message to the base 200 to indicate that it is in a non-moving mode, and consequently the base 200 won't perform any interaction detection based on monitoring vectors from their device until it detects that they have started a new trip.

Second, the user can indicate "I'm not driving". In this mode, the back-end will note that they are currently traveling (either as a passenger in a car or on a bus or similar) and interaction checking should not be performed. Once they are completely stationary for a pre-determined amount of time (e.g., 5 minutes, 10 minutes, 15 minutes, or other pre-determined time range, to name but a few examples) the back-end will reset and put them in non-moving mode until it detects they have started a new trip.

Figure 4E:
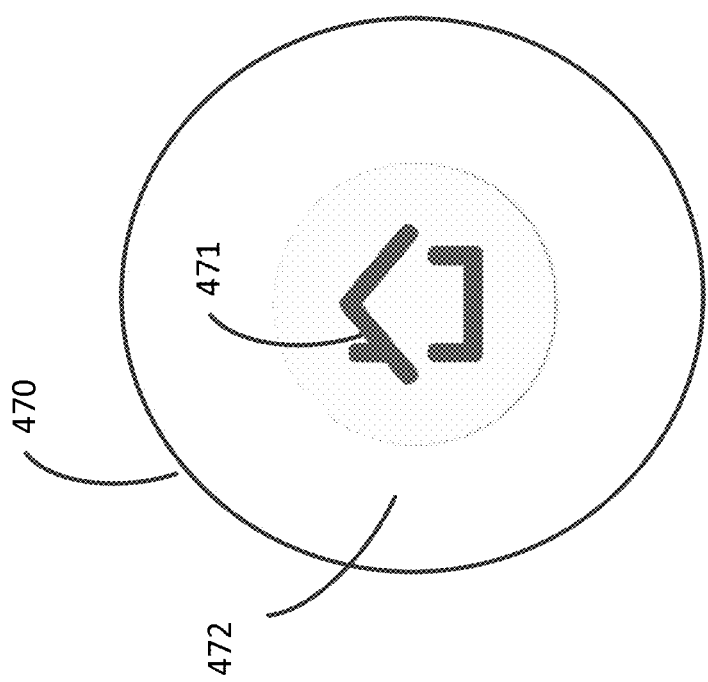
FIG. 4E schematically illustrates a geofence.

Third, the user can indicate "I'm home". Any time the user selects this option, the backend at base 200 will flag the device 111 as being in a non-moving mode. The back-end will also create a geofence (an exclusion circle, for example in response to input from a user) around the current location and save that into the data-store. An embodiment of a geofence 470 around a user's home 471 is schematically illustrated in FIG. 4E. The geofence 470 defines a geographic area around a point (in this example, the user's home 471) that causes the system to change behavior when the user's device 111 is within the geographic area 472.

For example, ins some embodiments, the base 200 reject trip starts while the device is in that location and automatically trigger trip ends when the user arrives in that location in the future. The user can have many geofences, such as place of employment, etc.

Some embodiments may combine the "I've arrived" and "I'm home" responses so that any time the user stops moving, a geofence is created. For example, if a vehicle operator passes by a shopping mall on the way to work each day, and a geofence is set there from the last time the operator stopped to shop, the back-end needs to reliably be able to either (a) not stop car mode when just passing by or (b) stop and restart car-mode with low impact and very minimal possibility of missed interaction notifications.

In some embodiments, if the user stops moving for more than a pre-determined amount of time (e.g., 5 minutes, 10 minutes, 15 minutes, or other pre-determined time range, to name but a few examples), the back-end will flag the user's device as non-moving mode until it detects another trip start.

Figure 6:
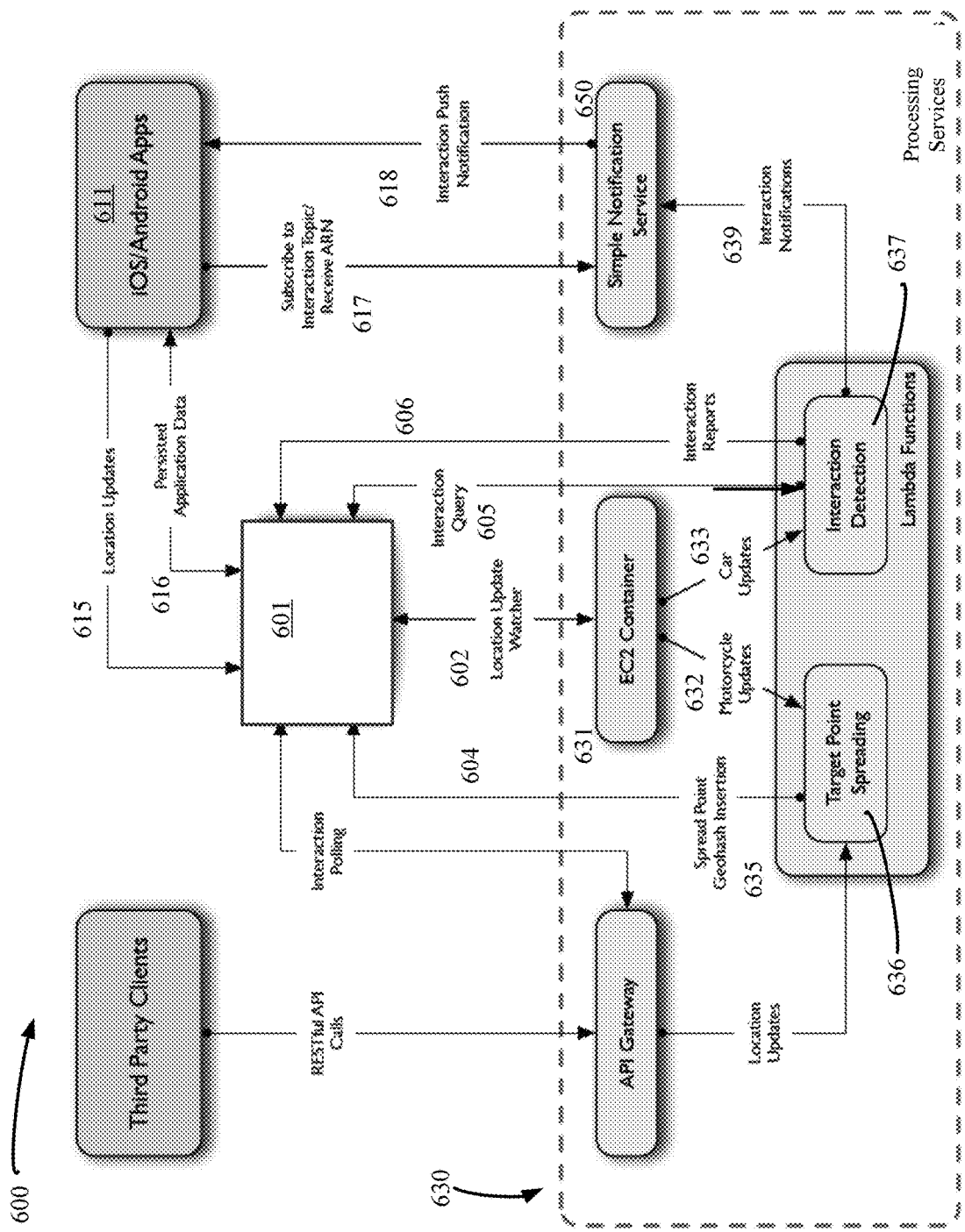
FIG. 6 schematically illustrates an embodiment of a proximity awareness system for motor vehicles and motorists.

FIG. 6 schematically illustrates an embodiment of a proximity awareness system 600 for motor vehicles and motorists. Embodiments of the operation of the system 600 are schematically illustrated in the flow charts in FIG. 7, FIG. 8, and FIG. 9. The system of FIG. 6 schematically illustrates the following features, by reference number:

601: Hub
   602: Data sent from hub to interaction detector 630
   603: Interaction polling data
   604: Spread point geohash data
   605: Interacting query
   606: Interaction reports
   615: Location updates
   616: Persisted Application data
   617: Subscribe to Interaction Topic/Receive ARN data
   618: Interaction Push Notification
   620: Third party clients
   621: RESTful API Calls
   630: Interaction detector
   631: EC2 Container (aka, the "Watcher")
   632: Motorcycle (target vehicle) updates
   633: Motor vehicle updates
   635: Data processor (Lamda functions)
   636: Target point spreading processor
   637: Interaction detection processor (aka, the "Seeker")
   650: Notification server FIG. 6 schematically illustrates an embodiment of a proximity awareness system for motor vehicles and motorists. This embodiment includes a hub 601 (which may be referred to as "Firebase"). The hub 601 receives location update data 615 (e.g., monitoring vectors) from vehicles (e.g., motorcycles 110 and other vehicles 120, 130) via communications devices (e.g., 112; 122; 132) on or in such vehicles, and processes the location data to detect potential interactions between vehicles. In some embodiments, the hub 601 sends location data 602 to an interaction process 630

FIG. 7 schematically illustrates a flow chart for an embodiment of location update functionality of a proximity awareness system. Step 701 includes receiving, at the hub 601, location updates (e.g., monitoring vectors) from at least one, and possibly two or more vehicles, such as a motorcycle (a "target vehicle" such as motorcycle 110) and another vehicle (such as automobile 120, for example). The location updates indicate the location of each vehicle at a given time, and include location information (e.g., GPS coordinates, or geographic coordinates derived from cell phone towers in communication with a communication device on or in the vehicle), and a time stamp to indicate when the vehicle is at the location indicated.

At step 702, data 602 is transmitted from the hub 601 to the EC2 container (aka, the "Watcher") in the interaction processor 630. In some embodiments, the interaction processor 630 may be remote from the hub 601, but the interaction processor 630 operates under the control of the hub 601.

Step 703 determines whether the incoming data is from a target vehicle (e.g., a motorcycle 110), in which case data is transmitted (632) to the target point spreading processor 636, and the method proceeds to target vehicle processing (FIG. 8) at step 704, or another motor vehicle (e.g., automobile 120, the driver of which is to be notified about the nearby presence of the target vehicle), in which case data is transmitted (633) to interaction detector 637 and the method proceeds to other vehicle processing (FIG. 8B) at step 706. In some embodiments, the process of step 703 may be performed by the EC2 Container 631, which may include, for example, a computer processor (e.g., a microprocessor) programmed to execute the process.

FIG. 8 schematically illustrates a flow chart for an embodiment of target vehicle processing of a proximity awareness system (target point spreading). In some embodiments, the process of FIG. 8 may be performed by target point spreading processor 636, which may be part of data processor 635, and may include, for example, a computer processor (e.g., a microprocessor) programmed to execute the process.

At step 801, the method creates an identifier for the target vehicle, and one or more points (which points may be known, collectively, as a "point spread") around the location of the target vehicle. For example, in FIG. 4C, the target vehicle is 110 has a point spread 450. Each the target vehicle tracked by the method has a unique identifier (for example, "Moto 110" for vehicle 110) and the location of the target vehicle may be designated as Moto 110-0. Each point in the point spread has a unique identifier associate with the identifier of the target vehicle. For example, the 9 points 450 in FIG. 4C may be identified, respectively, as Moto 110-1; Moto 110-2; Moto 110-3; Moto 110-4; Moto 110-5; Moto 110-6; Moto 110-7; Moto 110-8; and Moto 110-9). The points of the point spread may indicate physical locations in front of the target vehicle (e.g., points 461, 462 and 463 in FIG. 4C), parallel to the target vehicle (e.g., points 464, 465 and 466 in FIG. 4C), or behind the target vehicle (e.g., points 467, 578 and 469 in FIG. 4C).

In some embodiments, the method converts the locations of the target vehicle and the points in the point spread 450 into a geohash format, at step 802. A geohash, for a given item of location data, is a searchable form of that data which may be more easily searched, identified, and processed, than location data expresses as latitude and longitude, or GPS data format, or data based on cell tower locations.

At step 803, the method queries the database at hub 601 to determine whether the location of the target vehicle, and or the point spread, is already in the database. If not, the location of the target vehicle (e.g., Moto 110) and the location of the points of its point spread (e.g., Moto 110-1 to Moto 110-9) are stored in a database at the hub 601, at step 704, and the method processes the next location update received from a vehicle, at step 710.

Otherwise, the method assesses the preexisting data in the database, at step 705, to determine whether the location of the target vehicle and the location of the points of its point spread constitute newer (i.e., the data reflects the location of the target vehicle at more recent in time) data. If so, then the location of the target vehicle (e.g., Moto 110) and the location of the points of its point spread (e.g., Moto 110-1 to Moto 110-9) are written over the pre-existing data representing location of the target vehicle and the location of the points of its point spread in the database, at step 707. Then, at step 709, the method updates the speed and heading of the target vehicle, based on the most recent location data, and saves that updated speed and heading data to the database at the hub. The method then processes the next location update received from a vehicle, at step 710.

FIG. 9 schematically illustrates a flow chart for an embodiment of target vehicle search of a proximity awareness system. In some embodiments, the process of FIG. 9 may be performed by interaction detector 637, which may be part of data processor 635, and may include, for example, a computer processor (e.g., a microprocessor) programmed to execute the process.

At step 901, the method then analyzes target vehicle location data from the hub database to assess whether a target vehicle is within a predefined distance of a vehicle, such as vehicle 120 for example, which may be referred to as a "seeker." To that end, the method may define a radius around the last known location of the seeker vehicle. The radius may define a circle around the last known location of the vehicle, but the risk radius may define other shapes, and those shapes may be centered or located at points other than the last known location of the vehicle.

At step 902, the method determines whether any point of location data associated with a target vehicle (e.g., the location of a target vehicle, or a point within the point spread 450 of a target vehicle) is within the risk radius. If not, then continues at step 903, in which the interaction detection is stopped. Some embodiments update the data at the hub database to indicate that no interactions or potential interactions were identified at this time for the seeker.

Otherwise, the method continues to step 904, which assess the location data of the target vehicle to determine whether that data is a location of the vehicle (e.g., Moto 110-0), or a point within the point spread 450 of the target vehicle (e.g., Moto 110-1, etc.). Such determination may be made based on the naming convention of the location data points. For example, a data point ending in zero (e.g., Moto 110-0) represents the location of the target vehicle, and a data point ending in any digit other than zero (e.g., Moto 110-1) represents a point (e.g., 461) within the point spread 450 of that target vehicle.

If the location data represents point within the point spread 450 of the target vehicle (e.g., Moto 110-1, etc.), then step 906 directs the method back to step 904, such that the method continues to assess location data until it locates the target vehicle (i.e., Moto 110-0).

When step 904 detects the location of the target vehicle, step 906 directs the method to step 908 to execute transaction handling functions. In some embodiments, the transaction handling functions of step 908 may be performed by the data processor 635, which may include, for example, a computer processor (e.g., a microprocessor) programmed to execute the transaction handling functions.

The transaction handling functions further assess available data to determine whether to send a message to the seeker vehicle. In some embodiments, the transaction handling functions include assessing the time stamp of the respective location information from the target vehicle and the seeker vehicle, to assess whether the data is contemporaneous—that is, the data is close enough in time that the vehicle are close enough to one another so as to present a possibility of collision. For example, if the location, speed and heading of the target vehicle indicates that the target vehicle would already have passed the location of the seeker vehicle, then the data is close enough in time that the vehicle are close enough to one another so as to present a possibility of collision. In some embodiments, the target and seeker must be within a predetermined time of one another (e.g., 30 seconds) before they are deemed close enough to one another so as to present a possibility of collision.

In some embodiments, the transaction handling functions include assessing whether, and when, a message was sent to the seeker vehicle. For example, if a message about a target vehicle has been sent to the seeker vehicle within a predetermined amount of time (e.g., 5 minutes), the method may not send another such message, but otherwise will send or re-send such a message.

Unless the transaction handling functions conclude that no message should be sent, step 910 of the method notifies the seeker vehicle that a target vehicle is within its radius, and may provide location details of the target vehicle. If the transaction handling functions conclude that no message should be sent, then the method returns to step 901. For example, the method may send an interaction query 605 to the hub 601, and receive from the hub an address for the seeker. The method then sends an interaction notification 639 to a message transmitter (e.g., notification service 650), which, in turn, sends a message to the seeker, and more specifically, to a driver or occupant of the seeker.

Various embodiments may be implemented at least in part in any conventional computer programming language. For example, some embodiments may be implemented in a procedural programming language (e.g., "C"), or in an object oriented programming language (e.g., "C++"), or JAVA Script. Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of enhancing road safety for vehicles traveling on a network of roads, the method comprising:
   receiving, at an interaction detector, a plurality of monitoring vectors from a plurality of vehicles travelling on the network of roads, the plurality of vehicles including at least a first vehicle and a second vehicle, the interaction detector being remote from the plurality of vehicles;
   determining, from the plurality of monitoring vectors, whether there is an interaction between the first vehicle and the second vehicle, the interaction existing when the first vehicle is within a risk radius of the second vehicle, wherein:
      the risk radius is a predetermined distance such that the first vehicle and the second vehicle have a risk of collision, and
      the second vehicle is offset from, and not at, the center of a circle defined by the risk radius;
   the interaction being determined without use of prior knowledge of a pre-planned route of either of the first vehicle and the second vehicle on the network of roads; and
   alerting an occupant of at least one of the first vehicle and the second vehicle that the interaction on the network of roads has been determined.

2. The method of claim 1, wherein determining, from the plurality of monitoring vectors, whether there is an interaction between the first vehicle and the second vehicle further comprises first determining whether there is a potential interaction between the first vehicle and the second vehicle.

3. The method of claim 2 wherein:
   the monitoring vector from the first vehicle comprises at least a location of the first vehicle, and
   determining whether there is a potential interaction between the first vehicle and the second vehicle comprises:
      establishing a plurality of points proximate to the first vehicle; and
      determining whether any of the plurality of points is within the risk radius of second vehicle.

4. The method of claim 1, further comprising causing the at least one of the first vehicle and the second vehicle to take evasive action to avoid another of the plurality of vehicles.

5. The method of claim 1, wherein receiving a monitoring vector from a vehicle comprises receiving monitoring vectors generated by a location-monitoring device in said vehicle.

6. The method of claim 1 wherein the second vehicle is at the center of an area defined by the risk radius.

7. The method of claim 1 wherein determining whether the first vehicle and the second vehicle have a risk of collision comprises determining whether the first vehicle and the second vehicle are on the same road such that a collision is possible.

8. A method of operating an autonomous vehicle, the method comprising:
   receiving, at an interaction detector, a plurality of monitoring vectors from at least an autonomous vehicle and a second vehicle;
   determining, from the plurality of monitoring vectors, whether there is an interaction between the autonomous vehicle and the second vehicle, the interaction existing when
      the autonomous vehicle and the second vehicle are within a risk radius of one another, the risk radius defined as a predetermined distance, such that the autonomous vehicle and the second vehicle have a risk of collision, and
      the second vehicle is offset from, and not at, the center of a circle defined by the risk radius; and
   remotely controlling the autonomous vehicle, based on a detected interaction, to avoid a collision between the autonomous vehicle and the second vehicle.

9. The method of claim 8, wherein remotely controlling the autonomous vehicle comprises sending instructions to a control system in the autonomous vehicle, to take an action selected from the group consisting of slowing the autonomous vehicle, stopping the autonomous vehicle, and performing an evasive maneuver to avoid a collision with the second vehicle.

10. A system for enhancing safety on a network of roads, comprising:
    an interaction detector having a communications interface for receiving a plurality of monitoring vectors from a first vehicle and a second vehicle travelling on the network of roads;
    an interaction risk module configured to determine, from the plurality of monitoring vectors, whether there is an interaction between the first vehicle and second vehicle, the interaction determined without use of prior knowledge of a pre-planned route of either of the first vehicle and the second vehicle on the network of roads, by determining that the first vehicle is within a risk radius of the second vehicle, wherein
       the risk radius is a predetermined distance; and
       the second vehicle is offset from, and not at, the center of a circle defined by the risk radius;
    such that the first vehicle and second vehicle have a risk of collision with one another on the network of roads; and
    a message generator configured to generate a message to at least the first vehicle in response to a determination, by interaction risk module, of an interaction, and to send the message to the first vehicle via a vehicle the communications interface.

11. The system of claim 10, wherein the second vehicle is a motorcycle or a bicycle.

12. The system of claim 10, wherein the interaction risk module is further configured to determine whether there is an interaction between the first vehicle and second vehicle on the network of roads by first determining whether there is a potential interaction between the first vehicle and second vehicle on the network of roads, based on a point spread generated around the location of the second vehicle.

13. The system of claim 10, wherein the message generator is further configured to generate a message to the first vehicle only if such a message has not been generated to said first vehicle within a predetermined time of a determination, by interaction risk module, of an interaction.

14. The system of claim 10, wherein the interaction risk module is further configured to determine that there is an interaction between the first vehicle and a second vehicle such that the first vehicle and second vehicle have a risk of collision with one another, only if monitoring vectors from first vehicle and second vehicle are contemporaneous.

15. The system of claim 10, wherein the message generator is further configured to generate a message to the first vehicle only if the first vehicle is not within a geofence.

16. The system of claim 10, wherein the first vehicle is an autonomous vehicle, and the message includes instructions to remotely control the first vehicle to avoid a potential collision between the first vehicle and the second vehicle.

17. A method of enhancing road safety for vehicles traveling on a network of roads, the method comprising:
    receiving, at an interaction detector, a plurality of monitoring vectors from a plurality of vehicles travelling on the network of roads, the plurality of vehicles including at least a first vehicle and a second vehicle, the interaction detector being remote from the plurality of vehicles;
    determining, from the plurality of monitoring vectors, whether there is an interaction between the first vehicle and the second vehicle, the interaction existing when the first vehicle is within a risk radius of the second vehicle, the risk radius defined as a predetermined distance from a projected future location of the second vehicle, such that the first vehicle and the second vehicle have a risk of collision, the interaction being determined without use of prior knowledge of a pre-planned route of either of the first vehicle and the second vehicle on the network of roads; and
    alerting an occupant of at least one of the first vehicle and the second vehicle when the interaction on the network of roads is determined.

18. The method of claim 17, wherein determining, from the plurality of monitoring vectors, whether there is an interaction between the first vehicle and the second vehicle further comprises first determining whether there is a potential interaction between the first vehicle and the second vehicle.

19. The method of claim 18 wherein:
    the monitoring vector from the first vehicle comprises at least a location of the first vehicle, and
    determining whether there is a potential interaction between the first vehicle and the second vehicle comprises:
       establishing a plurality of points proximate to the first vehicle; and
       determining whether any of the plurality of points is within the risk radius of the second vehicle.

20. The method of claim 17, further comprising causing the at least one of the first vehicle and the second vehicle to take evasive action to avoid another of the plurality of vehicles.

21. The method of claim 17, wherein receiving a monitoring vector from a vehicle comprises receiving a monitoring vector generated by a location-monitoring device in said vehicle.

22. The method of claim 17 wherein determining whether there is an interaction between the first vehicle and the second vehicle comprises determining whether the first vehicle is within a risk radius of the second vehicle.

23. The method of claim 22 wherein the second vehicle is at the center of an area defined by the risk radius.

24. The method of claim 17 wherein determining whether the first vehicle and the second vehicle have a risk of collision comprises determining whether the first vehicle and the second vehicle are on the same road such that a collision is possible.

25. A method of operating an autonomous vehicle, the method comprising:
  receiving, at an interaction detector, a plurality of monitoring vectors from at least the autonomous vehicle and a second vehicle;
  determining, from the plurality of monitoring vectors, whether there is an interaction between the autonomous vehicle and the second vehicle, the interaction existing when the autonomous vehicle and the second vehicle are within a risk radius of one another, the risk radius defined as a predetermined distance extending from a projected future location of the second vehicle,
  such that the autonomous vehicle and the second vehicle have a risk of collision; and
  remotely controlling the autonomous vehicle, based on a detected interaction, to avoid a collision between the autonomous vehicle and the second vehicle.

26. The method of claim 25, wherein remotely controlling the autonomous vehicle comprises sending instructions, to a control system in the autonomous vehicle, to take an action selected from the group consisting of slowing the autonomous vehicle, stopping the autonomous vehicle, and performing an evasive maneuver to avoid a collision with the second vehicle.

27. A system for enhancing safety on a network of roads, comprising:
  an interaction detector having a communications interface for receiving a plurality of monitoring vectors from a first vehicle and a second vehicle travelling on the network of roads;
  an interaction risk module configured to determine, from the plurality of monitoring vectors, whether there is an interaction between the first vehicle and the second vehicle, the interaction determined without use of prior knowledge of a pre-planned route of either of the first vehicle and the second vehicle on the network of roads, by determining whether the first vehicle is within a risk radius of the second vehicle, wherein the risk radius is defined as a predetermined distance extending from a projected future location of the second vehicle, such that the first vehicle and second vehicle have a risk of collision with one another on the network of roads; and
  a message generator configured to generate a message to at least the first vehicle in response to a determination, by interaction risk module, of an interaction, and to send the message to the first vehicle via a vehicle the communications interface.

28. The system of claim 27, wherein the second vehicle is a motorcycle or a bicycle.

29. The system of claim 27, wherein the interaction risk module is further configured to determine whether there is an interaction between the first vehicle and second vehicle on the network of roads by first determining whether there is a potential interaction between the first vehicle and second vehicle on the network of roads, based on a point spread generated around the location of the second vehicle.

30. The system of claim 27, wherein the message generator is further configured to generate a message to the first vehicle only when such a message has not been generated to said first vehicle within a predetermined time of a determination, by interaction risk module, of an interaction.

31. The system of claim 27, wherein the interaction risk module is further configured to determine that there is an interaction between the first vehicle and a second vehicle such that the first vehicle and second vehicle have a risk of collision with one another, only when monitoring vectors from first vehicle and second vehicle are contemporaneous.

32. The system of claim 27, wherein the first vehicle is an autonomous vehicle, and the message includes instructions to remotely control the first vehicle to avoid a potential collision between the first vehicle and the second vehicle.

* * * * *